United States Patent
Boucher et al.

(10) Patent No.: US 10,023,367 B1
(45) Date of Patent: Jul. 17, 2018

(54) CHILD-RESISTANT ACTUATOR FOR A LIQUID DISPENSING SPOUT

(71) Applicant: Scepter Manufacturing, LLC, Wilmington, DE (US)

(72) Inventors: Luc Boucher, Ottawa (CA); Rod Muir, South Mountain (CA); Michael Sirois, Ottawa (CA); Robert D Watters, Ottawa (CA)

(73) Assignee: Scepter Manufacturing, LLC., Wilmington, DE (US)

( * ) Notice: Subject to any disclaimer, the term of this patent is extended or adjusted under 35 U.S.C. 154(b) by 0 days.

(21) Appl. No.: 15/591,048

(22) Filed: May 9, 2017

(51) Int. Cl.
   *B67D 3/00* (2006.01)
   *B65D 47/24* (2006.01)
   *F16K 35/02* (2006.01)
   *B65D 47/06* (2006.01)
   *B65D 47/32* (2006.01)

(52) U.S. Cl.
   CPC ........... *B65D 47/249* (2013.01); *B65D 47/06* (2013.01); *B65D 47/32* (2013.01); *F16K 35/025* (2013.01)

(58) Field of Classification Search
   CPC ...... B65D 47/249; B65D 47/32; B65D 47/06; F16K 35/025; F16K 31/26
   See application file for complete search history.

(56) References Cited

U.S. PATENT DOCUMENTS

| | | | | |
|---|---|---|---|---|
| 1,644,093 | A * | 10/1927 | Shonnard | B66B 13/20 137/596.2 |
| 2004/0164098 | A1* | 8/2004 | Zheng | B67D 1/0878 222/153.14 |
| 2009/0026402 | A1* | 1/2009 | Loschelder | F16K 27/045 251/235 |
| 2009/0090745 | A1* | 4/2009 | Forbis | B65D 25/48 222/153.14 |
| 2012/0118431 | A1* | 5/2012 | Dickie | B65D 25/48 141/311 R |
| 2013/0233410 | A1* | 9/2013 | Meyer | F16K 35/025 137/343 |
| 2014/0021222 | A1* | 1/2014 | Forbis | B67D 7/005 222/153.14 |
| 2015/0210446 | A1* | 7/2015 | Wilkins | B65D 1/20 222/153.14 |
| 2015/0368005 | A1* | 12/2015 | Wilkinson | B65D 25/48 222/1 |

* cited by examiner

*Primary Examiner* — David Angwin
*Assistant Examiner* — Bob Zadeh
(74) *Attorney, Agent, or Firm* — Kelly and Krause, LTD.

(57) ABSTRACT

Displacement of a valve stem used in a liquid dispensing spout is prohibited by a lever mounted on a fulcrum. When a user-operated end of the lever is in a first position, the opposite end of the lever abuts a travel limiter. When the user-operated lever is in a second position, the opposite end of the lever points away from the travel limiter allowing the valve stem to be displaced.

14 Claims, 29 Drawing Sheets

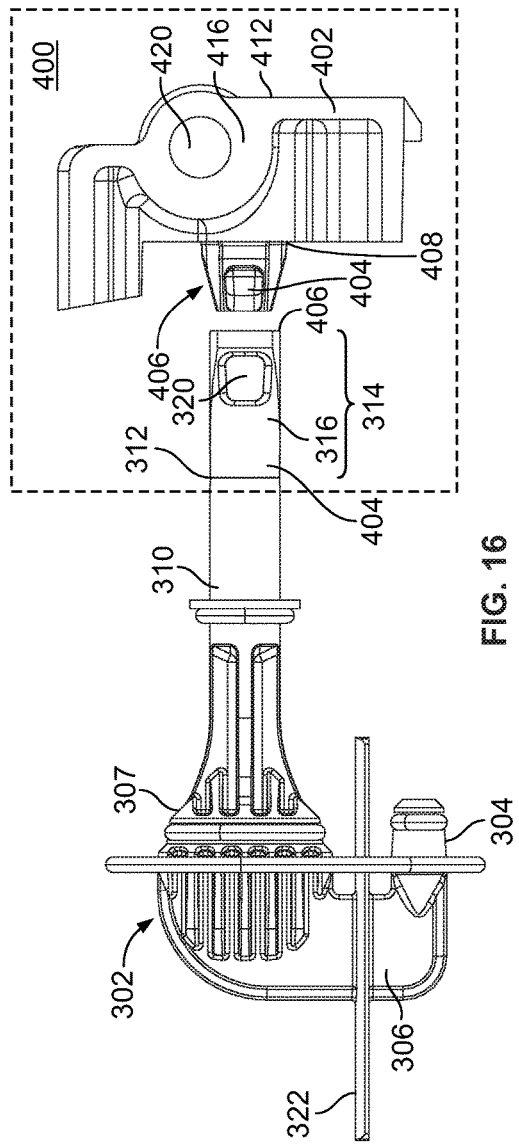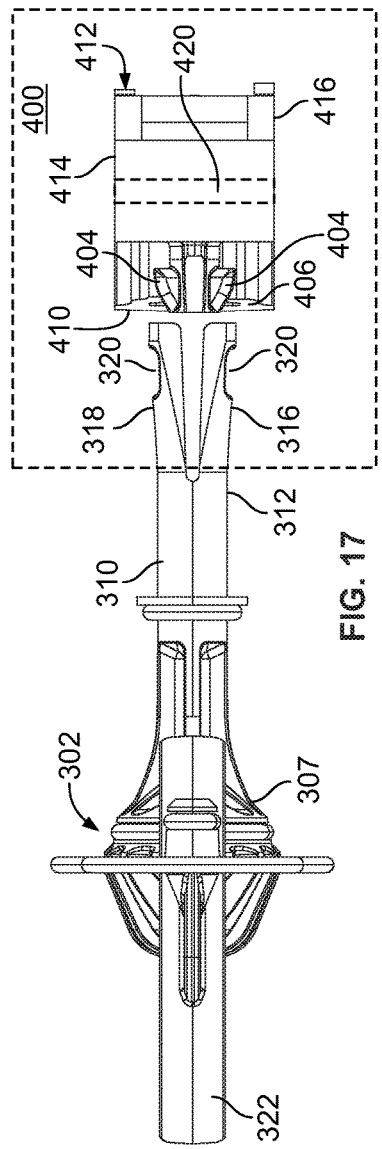

CHILD-RESISTANT ACTUATOR FOR A LIQUID DISPENSING SPOUT

BACKGROUND

Portable plastic fuel containers are well known. Most are equipped with a spout by which fuel in the container can be controllably dispensed.

While such spouts appear to be simple devices, they should satisfy environmental rules and regulations as well as consumer product safety regulations. They are also preferably safe and reliable to use in order to avoid product liability claims and preferably inexpensive to manufacture. A liquid fuel dispenser satisfying such requirements would be an improvement over the prior art.

BRIEF DESCRIPTION OF THE FIGURES

FIG. 16 is a side view of a linked poppet valve and its actuator;

FIG. 17 is a top view of a linked poppet valve and its actuator;

DETAILED DESCRIPTION

Figure 1A:
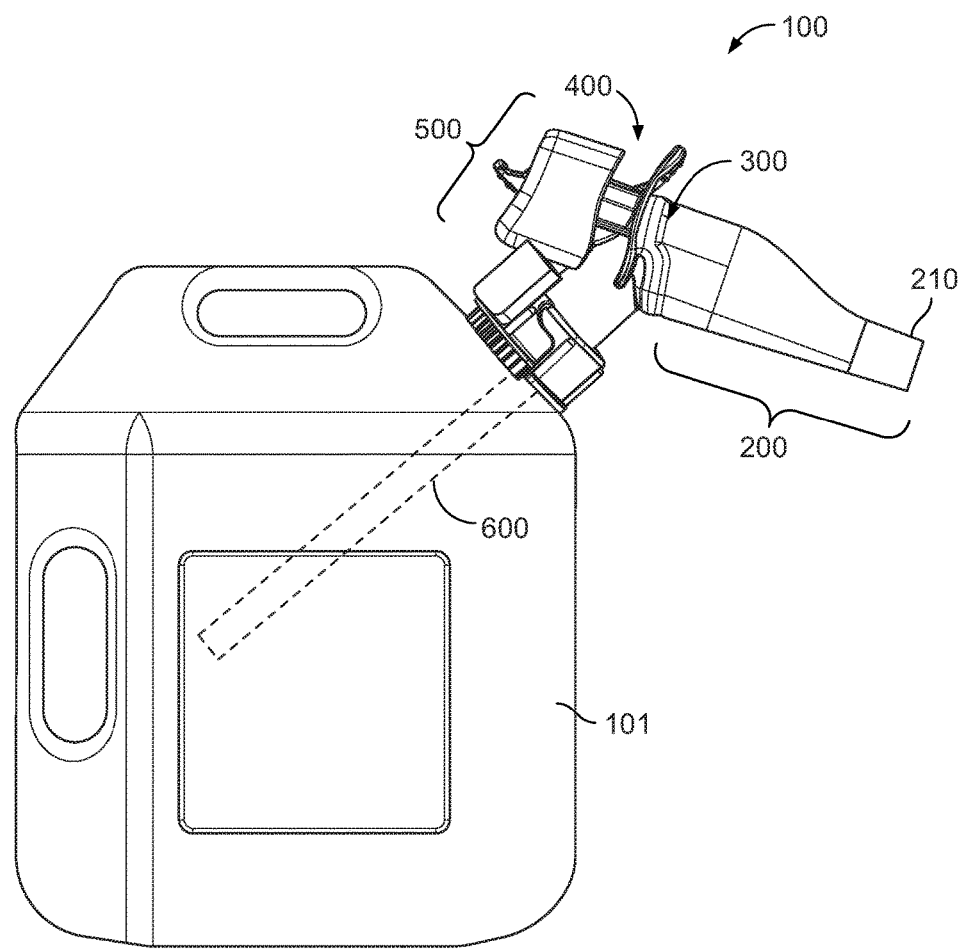
FIG. 1A depicts a liquid dispensing spout on a conventional, portable fuel canister.

FIG. 1A depicts a liquid dispensing spout 100 attached to a conventional, portable gasoline can, i.e., a reservoir 101. The reservoir 101 can be made of plastic or metal.

Figure 1B:
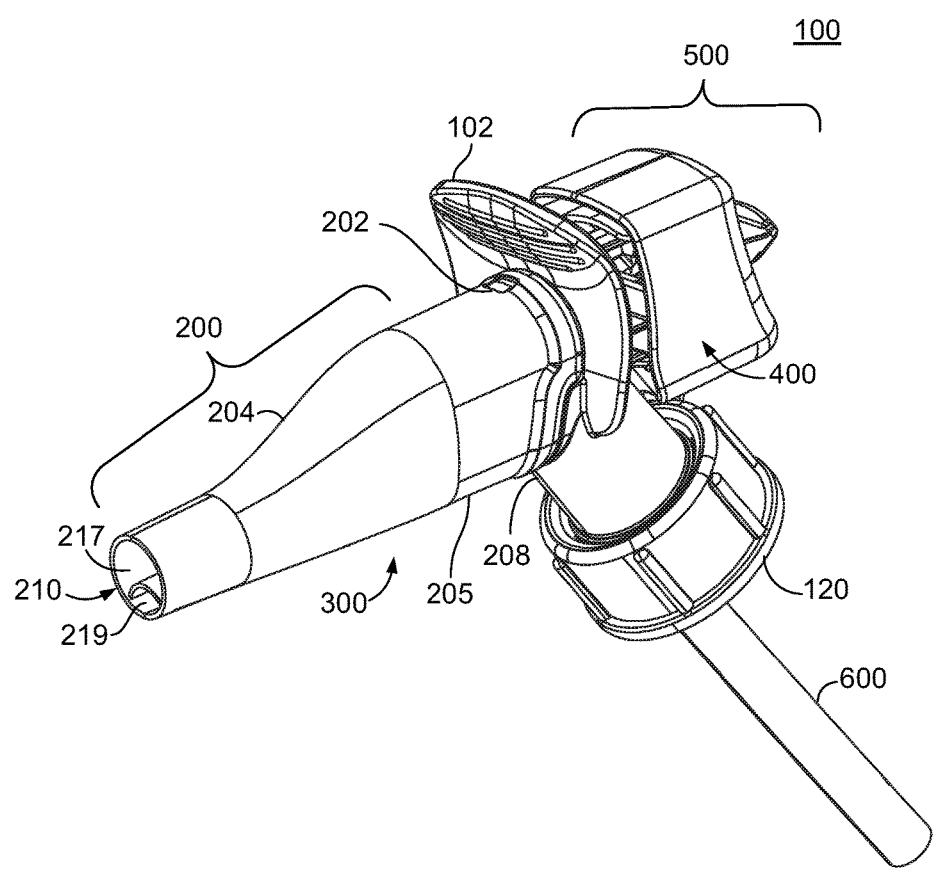
FIG. 1B is a front perspective view of a liquid dispensing spout.
Figure 2:
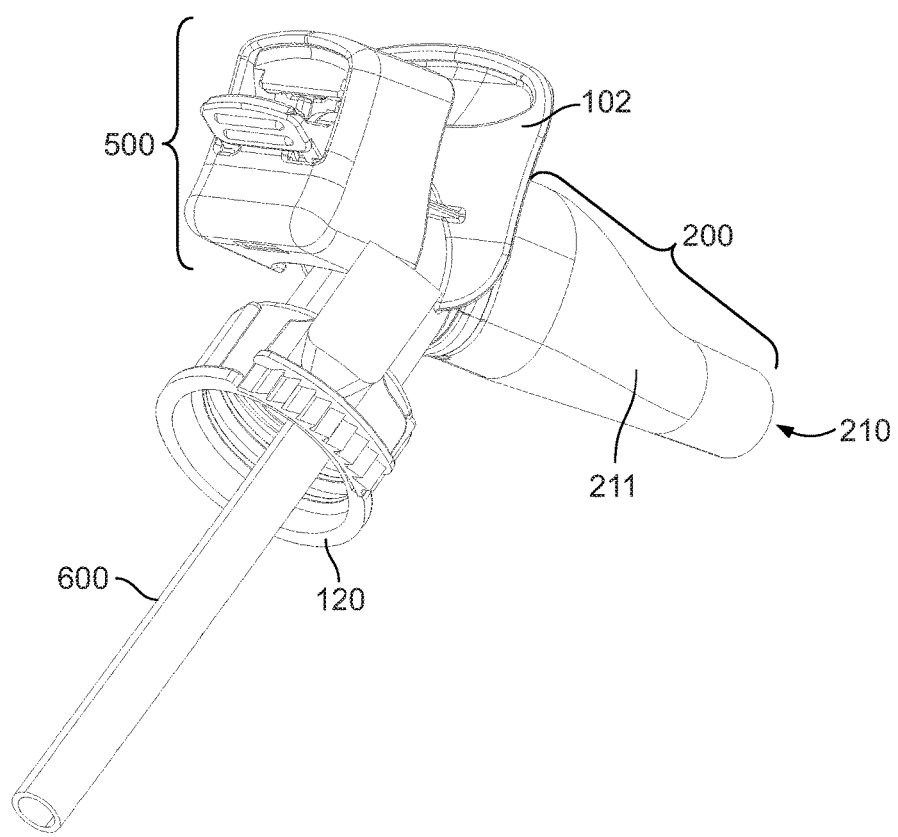
FIG. 2 is a second, rear perspective view of the liquid dispensing spout.
Figure 3:
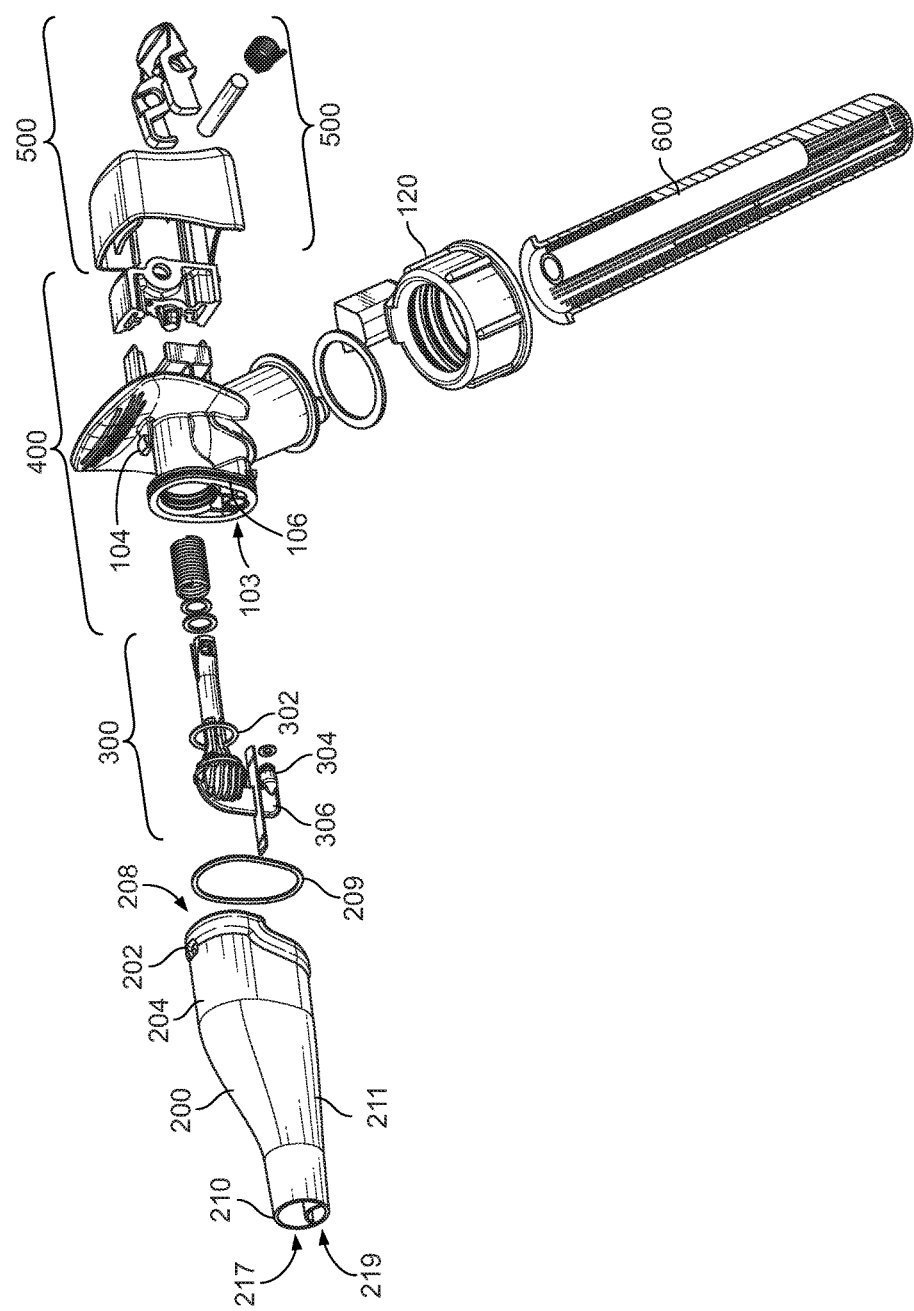
FIG. 3 is an exploded view of the liquid dispensing spout.
Figure 4:
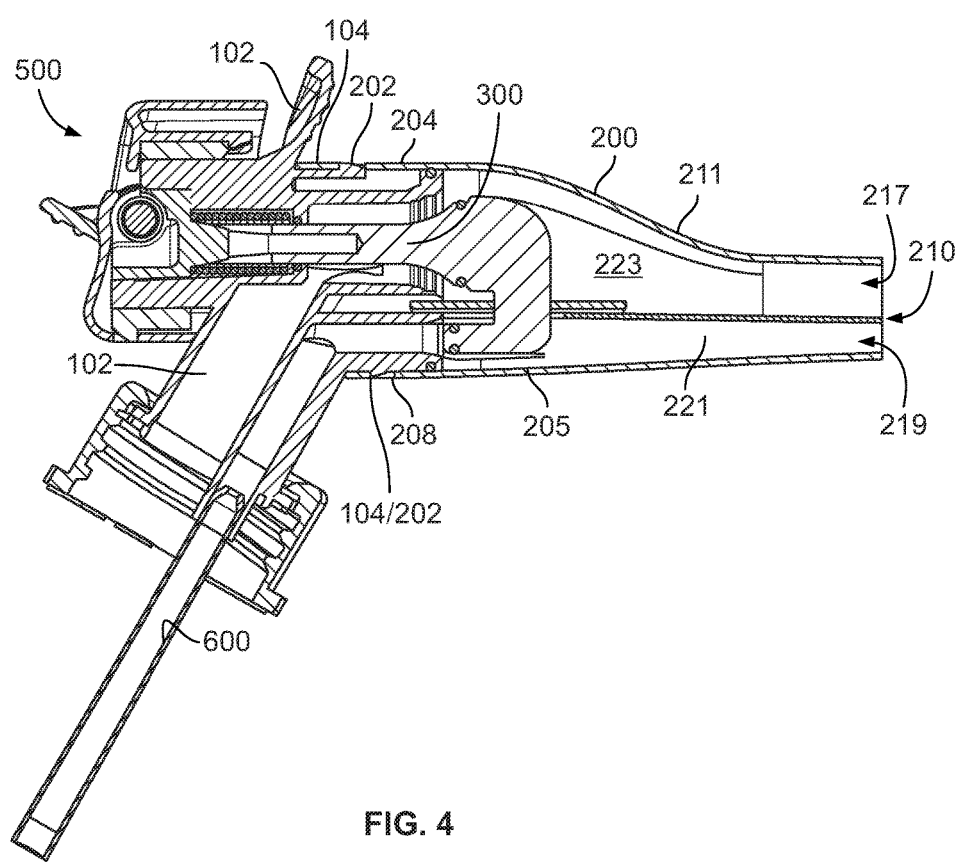
FIG. 4 is a cross-sectional view of the liquid dispensing spout.

FIG. 1B is a front perspective view of the liquid dispensing spout 100. FIG. 2 is a rear perspective view of the liquid dispensing spout 100. FIG. 3 is a cross sectional view of the liquid dispensing spout 100.

As can be seen in FIGS. 1-3, the liquid dispensing spout 100 comprises a spout body 102. A nozzle 200 is attached to a front side 103 of the spout body 102 by plastic tabs 104, which are cantilevered from the front side 103, at both the top and bottom of the spout body 102.

The spout body 102 also "carries" or supports linked poppet valves 300, visible in in FIG. 3, a linked poppet valve actuator 400, also visible in FIG. 3, a child-resistant actuator 500, and an air inlet tube 600.

An internally-threaded mounting collar 120, also attached to the spout body 102 "screws onto" a threaded inlet of the reservoir 101. The mounting collar 120 provides a substantially air-tight seal between the liquid dispensing spout 100 and the reservoir 101.

As described below and as shown in the figures, the liquid dispensing spout 100 allows a liquid to be controllably dispensed from the reservoir 101, which is preferably sealed by the mounting collar 120 so that the reservoir 101 is essentially air tight.

As used herein, the term, "controllably dispensed" should be construed as dispensing liquid from the reservoir 101 with little or no pulsation of liquid flowing from nozzle 200. Such pulsation is sometimes referred to as either "chugging," "glugging" or burping. Regardless of the term used to describe the pulsation phenomenon it is caused by negative pressure that develops in an unvented or inadequately vented reservoir by the effluence of liquid, and a sudden in-rush of air to the reservoir through the conduit through which the liquid is supposed to flow.

"Controllably dispensed" also includes inhibiting the operation of the liquid dispensing spout by a young child. It also includes inhibiting the flow of liquid from the reservoir 101 when the open end 210 of the nozzle 200 becomes immersed or submerged in the liquid being dispensed.

With regard to being child resistant, the liquid dispensing spout 100 is configured as described below such that fluid can be dispensed after disabling a mechanical safety "switch" and then pushing the poppet valve actuator 400 toward the spout body 102.

Fluid flow is inhibited after the open end of the nozzle 200 becomes submerged by cutting off the flow of air into the reservoir 101 via the nozzle 200 thereby creating a negative pressure in the reservoir 101. Stated another way, vent air into the reservoir 101 is cut off when the reservoir 101 is rotated or tipped from an upright position and when the open end 210 of the nozzle is submerged.

Figure 25A:
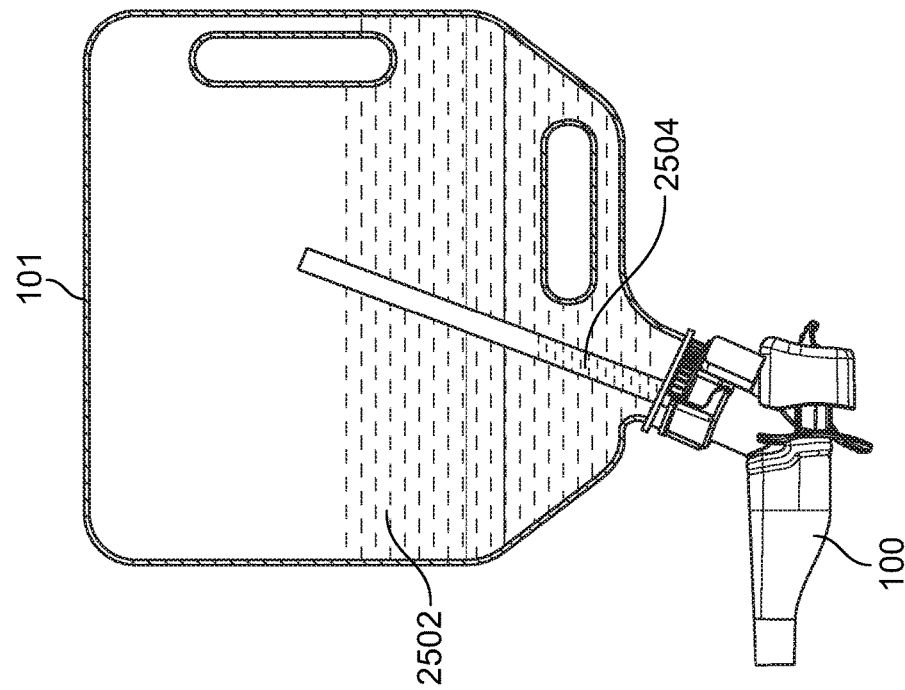
FIG. 25A shows the liquid dispensing spout attached to an upright, conventional portable fuel canister that contains fuel, the canister being shown in cross section.
Figure 25B:
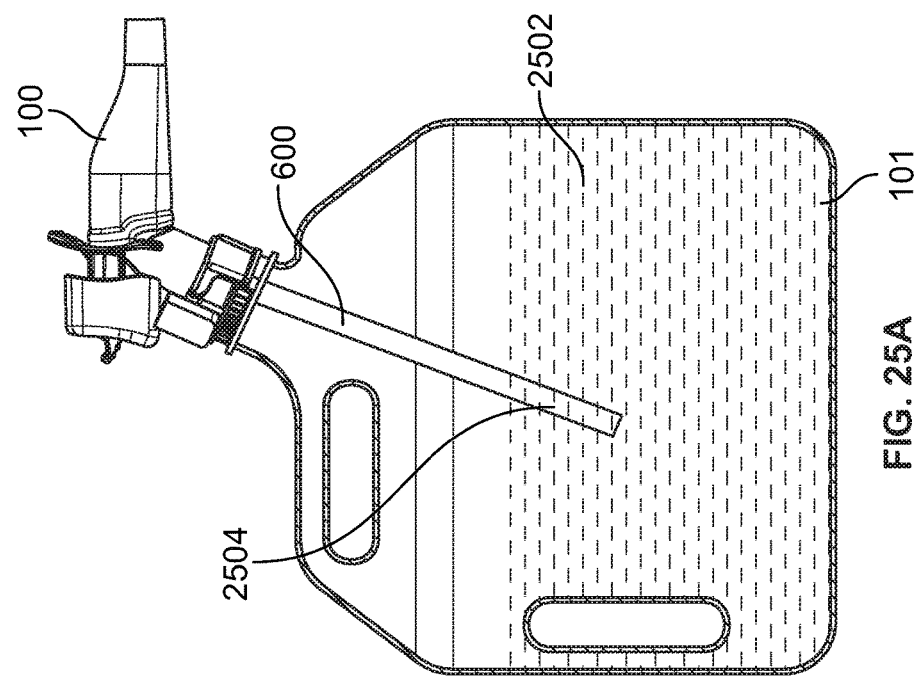
FIG. 25B shows the liquid dispensing spout attached to an inverted, conventional portable fuel canister that contains fuel, the canister being shown in cross section.

As shown in FIGS. 1A, 25A and 25B, the vent tube 600 extends downwardly from the mounting collar 120. The vent tube 600 has a length such that its distal open end 602 is near the bottom of the reservoir 101. When the reservoir 101 is upright as shown in FIG. 25A, a relatively small volume of liquid will be pushed upwardly into the vent tube. When the reservoir 101 is rotated or tilted, as shown in FIG. 25B, some liquid in the vent tube 600 may become trapped inside the tube 600.

By opening a liquid control poppet before the air control poppet opens, a small volume of liquid from the reservoir 101 flows out of the reservoir 101 before air is allowed into the reservoir 101. Allowing liquid to flow out of the reservoir 101 before air flows in, creates a small negative pressure in the reservoir, which evacuates liquid trapped in the vent tube 600 and allowing air to thereafter flow into the reservoir 101. The sequential opening of the poppet valves 300 as described below is thus important to controllably dispensing liquid.

Nozzle

The nozzle 200 of the liquid dispensing spout 100 is removably attached to a front face 103 of the spout body 102 by plastic tabs 104 cantilevered from the top and bottom of the front face 103 of the spout body 102. The nozzle 200 is thus not permanently attached but can be removed from the spout body 102 by depressing the tabs 104. The tabs 104, which can be deflected, "removably" attach the spout by engaging (latch into) small, substantially square or rectangular "windows" 202 located near the top surface 204 of the nozzle 200 and the bottom surface 205 of the nozzle 200. The tabs 104 and windows 202 thus lock or engage the nozzle 200 to the front face 103 of the spout body 102.

Those of ordinary skill in the art should know that a fluid is a substance that tends to flow or conform to the outline of its container. Liquids and gases are thus fluids.

As best seen in FIGS. 5-8, the nozzle 200 provides two, physically separate fluid conduits 221 and 223, which carry air and liquid respectively in opposite directions, i.e, to and from the spout body 102 respectively. Liquid from the reservoir 101 enters the upper conduit 223 at a fuel inlet port 215 at the first end 208 of the nozzle 200. Liquid exits the nozzle 200 from a fuel outlet port 217 located at the distal second end 210 of the nozzle 200.

The lower conduit 221 carries air. It is defined by a convex surface having longitudinal edges joined to the bottom 205 of the nozzle 200. The lower conduit carries air that enters the conduit 221 at the outlet end 210 of the nozzle 200. Air flows inwardly through the lower conduit 221 and to the spout body 102. Air is controllably flowed through the spout body 102 and into the reservoir 101 by one of the linked poppet valves 300 via the vent tube 600, albeit after the vent tube 600 is evacuated by a small negative pressure created in the reservoir 101 by opening the liquid control poppet before the air control poppet.

Those of ordinary skill in the art should recognize that in an alternate embodiment, the fluid-carrying conduit 223 can be located below the air-carrying conduit 221. Such an embodiment, however, loses advantages provided by the air-carrying conduit below the liquid-carrying conduit, at least one of which is improved air flow. As described below, momentum of the outwardly-flowing liquid stream above the air intake port 219 reduces the likelihood that liquid will be drawn into the air intake port.

Merriam-Webster's Dictionary defines "ovoid" as resembling the shape of an egg. "Ovate" on the other hand means having an outline like the longitudinal section of an egg with the basal end being broader.

Figure 5:
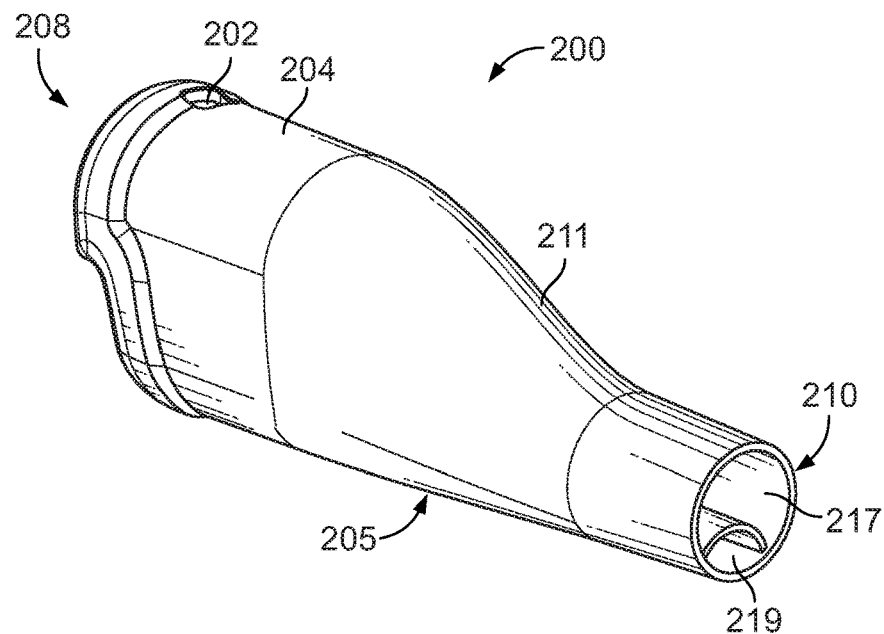
FIG. 5 is a front perspective view of a nozzle for the liquid dispensing spout.

As best seen in FIG. 5, the distal or second end 210 of the nozzle 200 has a substantially circular cross sectional shape. The lower, air conduit 221, however, has convex-shaped an air inlet port 219 at the second end 210 of the nozzle 200.

Figure 6:
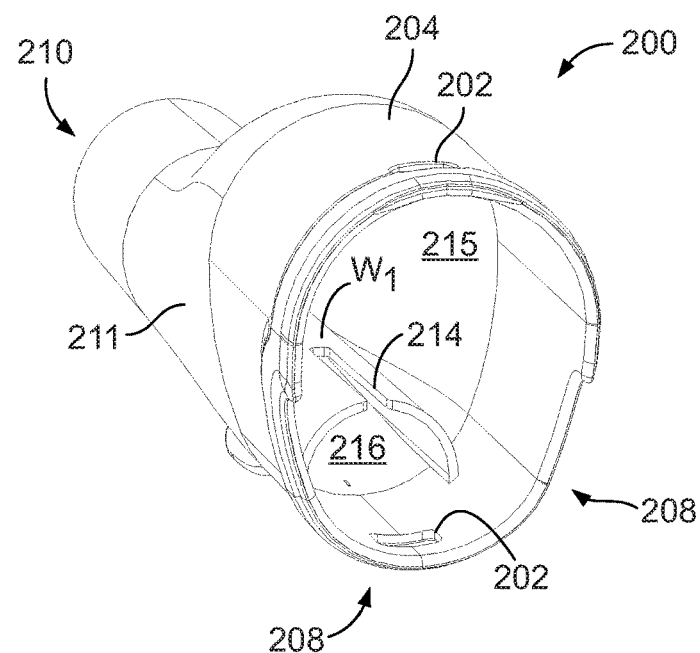
FIG. 6 is a rear perspective view of the nozzle.
Figure 7:
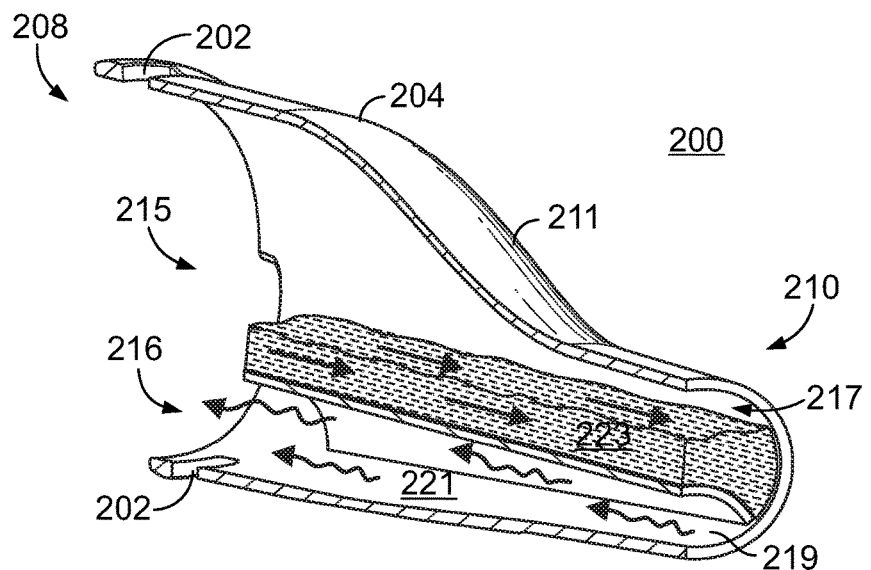
FIG. 7 is a cutaway view of the nozzle.
Figure 8:
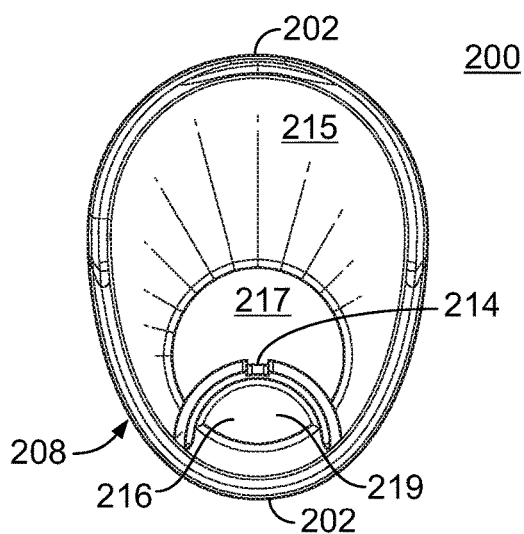
FIG. 8 is an end view of the nozzle, looking into the nozzle from the end that abuts the body of the liquid dispensing spout.

As best seen in FIG. 6, the first end 208 of the nozzle 208 is substantially ovate-shaped. It is attached to the substantially ovate-shaped front face 103 of the spout body 102 by the aforementioned tabs 104 and windows 202.

At the first end 208 of the nozzle 200, the air conduit 221 has a convex-shaped air outlet port 216. As can be seen in FIG. 3, a substantially ovate-shaped gasket 209 between the first end 208 of the nozzle 200 and the front face 103 of the spout body 102 enables a substantially air-tight seal between the nozzle 200 and spout body 102 when the nozzle 200 is attached to the spout body 102 by the engagement of the tabs 104 and windows 202.

FIG. 6 shows a slot 214 formed in the convex-shaped "top" surface of the outlet end or port 216 of the air conduit 221. The slot 214 has a width, W1, selected to provide a clearance fit with a "web" 306 portion of the linked poppet valves 300.

As described below, the web 306 holds the two linked poppet valves 302, 304 in a space-apart relation to each other. As described below, a flow path separator 322 extending from the web 306 fits over the slot 214, effectively preventing liquid in the liquid conduit 223 from leaking into the air conduit 221.

The liquid outlet port 217 and air inlet port 219 at the second end 210 are considered herein as being "enclosed" within a substantially circular "orifice" defining the second end 210 of the nozzle. That orifice also is considered to be a "closed curve," which is of course a curve with no endpoints and which completely encloses an area. Each port 217, 219, however has its own open area. As described below, the areas of the ports 217, 219 are not selected at random but are instead selected such that the ratio between them provides a laminar or nearly laminar flow of liquid flowing out of the liquid port 217.

Similarly, the liquid inlet port 215 and the air outlet port 216 at the first end 208 of the nozzle 200 are considered as being "enclosed" within the substantially ovate-shaped first end 208, which is also a closed curve. As shown in FIG. 6, however, the ports 215, 216 at the first, however, have their own corresponding open areas.

The liquid inlet port 215 at the first end 208 of the nozzle 200 has an area greater than the area of the liquid outlet port 217 at the second end 201 of the nozzle 200. The reduction in area between the first end 208 and the second 210 of the nozzle 200 is provided by an intermediate, transition section 211, which provides a second end 210 have a size and shape that can fit into a container or opening into which liquid such as gasoline needs to be dispensed. Stated another way, the intermediate section 211 reduces the area of the front face 103 of the spout body 102, and which is required to accommodate the side-by-side poppets used in the spout body, to a size that fits into the gas tank inlet restrictors of many automobiles.

At the second end 210 of the nozzle 200, the air inlet port 219 is purposefully located below the fluid outlet port 217. Experimentation revealed that momentum of a liquid stream flowing out of the nozzle 200 at the second end 210 prevents or at least significantly reduces liquid being drawn into the air inlet port 219 during dispensing. The liquid stream momentum, however, will depend on its velocity. The liquid stream velocity will of course depend in part on the cross sectional area of the liquid outlet port 217 but will also depend on volumetric air flow rate into the reservoir 101, inasmuch as the reservoir 101 is air tight or at least substantially air tight, the liquid stream output flow rate from the port 217 depends on the volumetric flow rate of air into the air inlet port 219. The flow rate of air into and through the air into the reservoir 101 will thus depend on the area of the air inlet port 219.

In the preferred embodiment, the area of the liquid inlet port 215, the area of the air outlet port 216, the area of the liquid outlet port 217, the area of the air inlet port 219 and the lengths of the air and liquid conduits 221 and 223 respectively, were selected such that the gravitational flow rate from the liquid outlet port 217 was between about 2.0 and 2.5 gallons per minute and having a substantially laminar flow, i.e., a liquid outlet flow without pulsation. An optimum ratio of the liquid output port 217 area to the air input port 219 area was experimentally determined to be about four to one (4:1) for gasoline or other liquids having viscosities between about 0.5 centipoise and 1.5 centipoise. (Water has a viscosity of 1.0 centipoise.) Such a ratio (about 4:1) produced a liquid output flow rate substantially laminar and without pulsation, using an appropriately constructed and dimensioned vent tube 600.

In an alternate embodiment of the nozzle, the areas of the liquid inlet port at the first end 208 of the nozzle 200 and the area of the liquid outlet port at the second end 210 of the nozzle are substantially the same, in which case, the intermediate section 211 is essentially straight. In such an alternate embodiment, the areas of the conduits and their respective openings can have the same or different cross sectional areas.

In other alternate embodiments, the cross sectional shapes of the air and liquid conduits and their respective openings are substantially circular, oval and rectangular. The shapes of the first and second ends of the spout can also be the same or similar shapes.

Linked Poppet Valves

Merriam-Webster's Dictionary defines "poppet" as a valve that rises perpendicularly to or from a mating seat. The valves commonly used in the combustion chambers of an internal combustion engine type are poppet valves.

The structure of the preferred linked poppet valves 300 comprising the liquid dispensing spout 100 is perhaps best seen in FIGS. 3, 13, 14A, 14B and 19. Understanding their operation, however, is assisted by reference to FIGS. 9-11.

Figure 13:
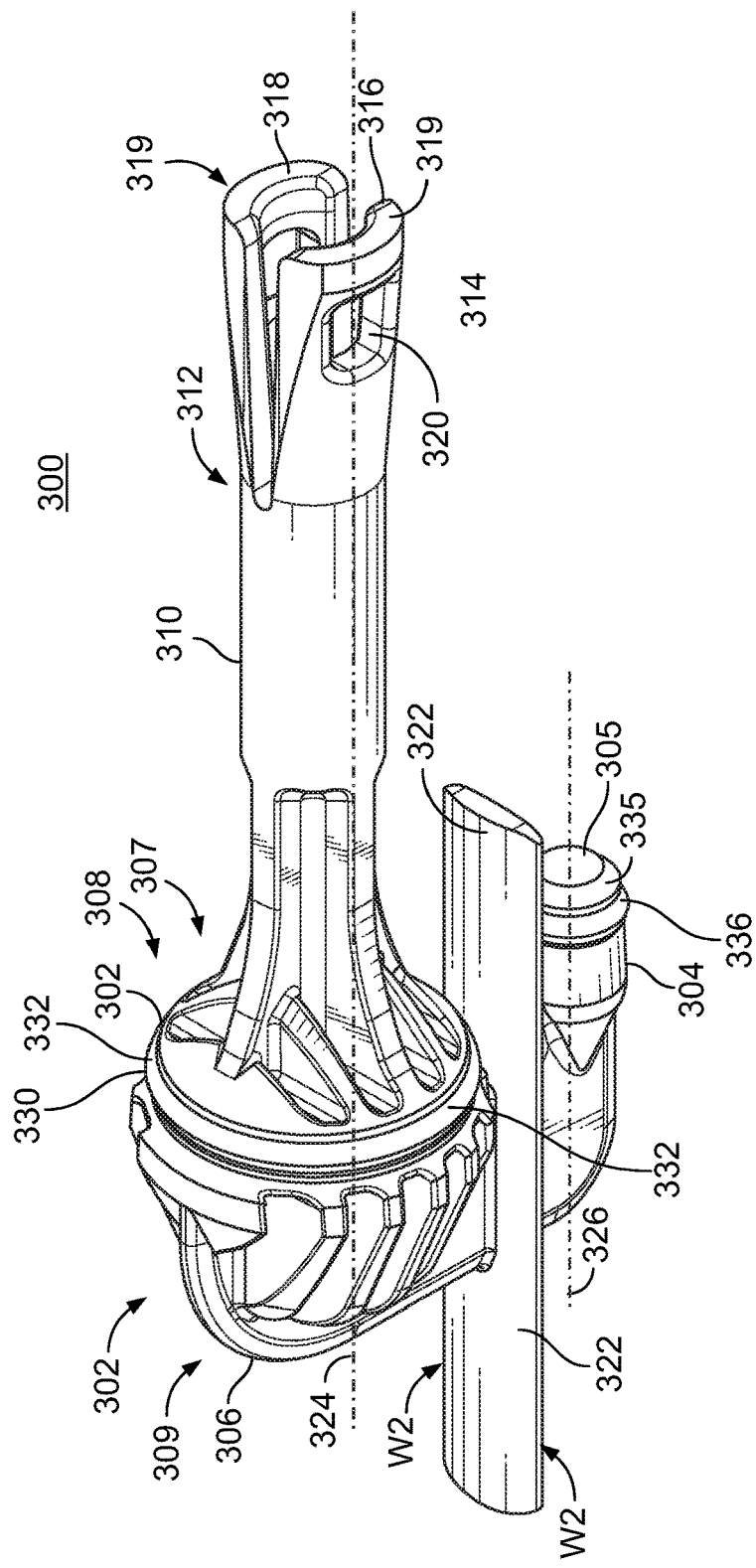
FIG. 13 is a perspective view of the preferred embodiment of linked poppet valves.
Figure 14A:
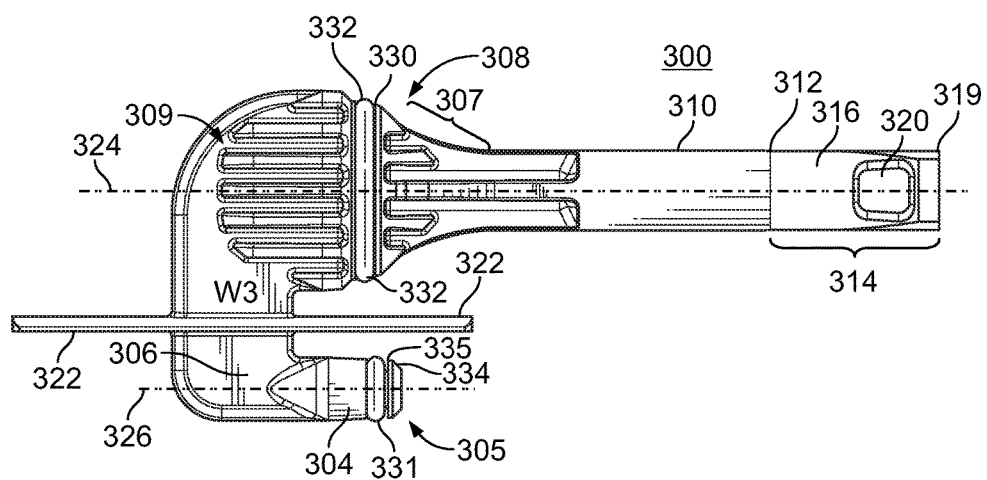
FIG. 14A is a side view of the preferred embodiment of linked poppet valves.
Figure 14B:
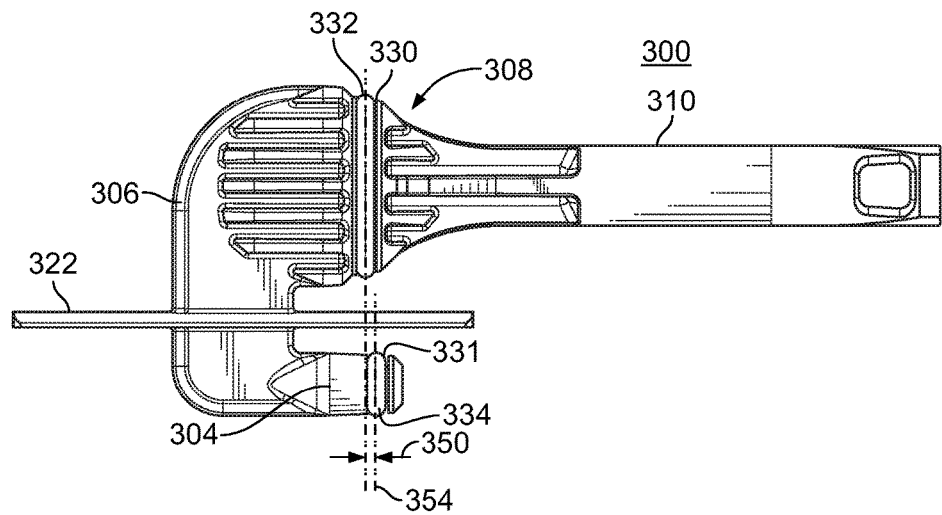
FIG. 14B is also the side view of the preferred embodiment of linked poppet valves, marked to show offset spacing between O-rings on the poppet valves.
Figure 15:
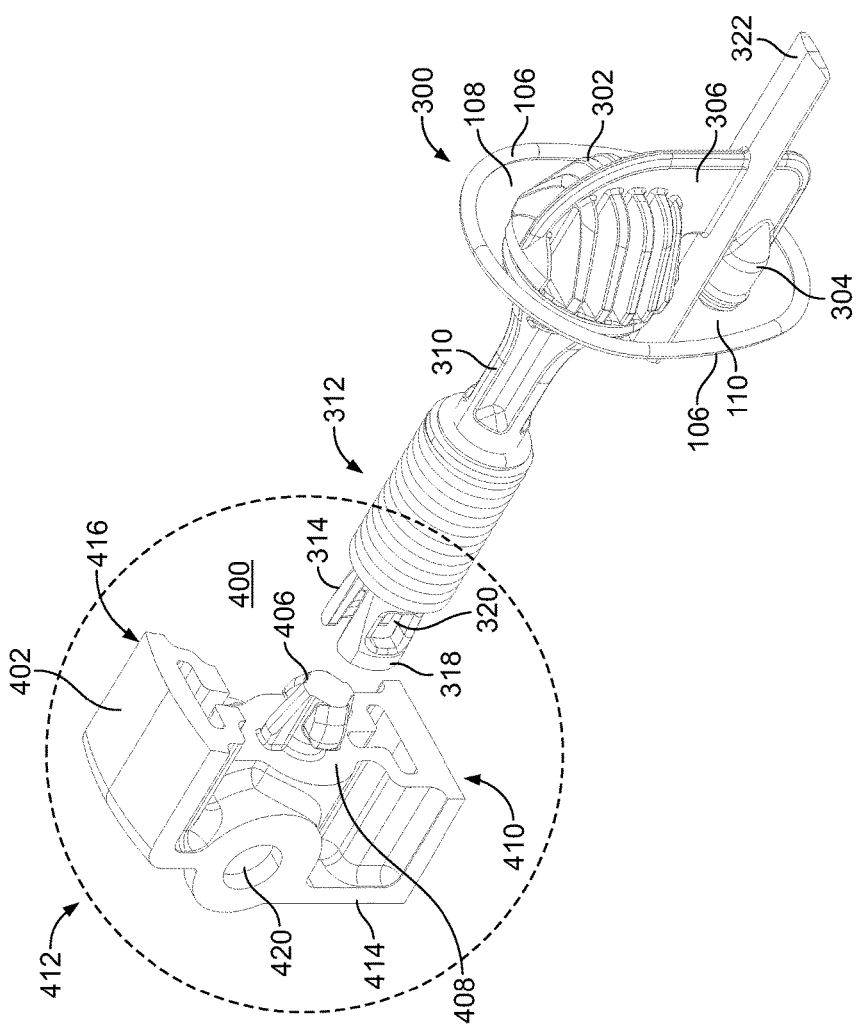
FIG. 15 is a perspective view of a linked poppet valve and its actuator.
Figure 18:
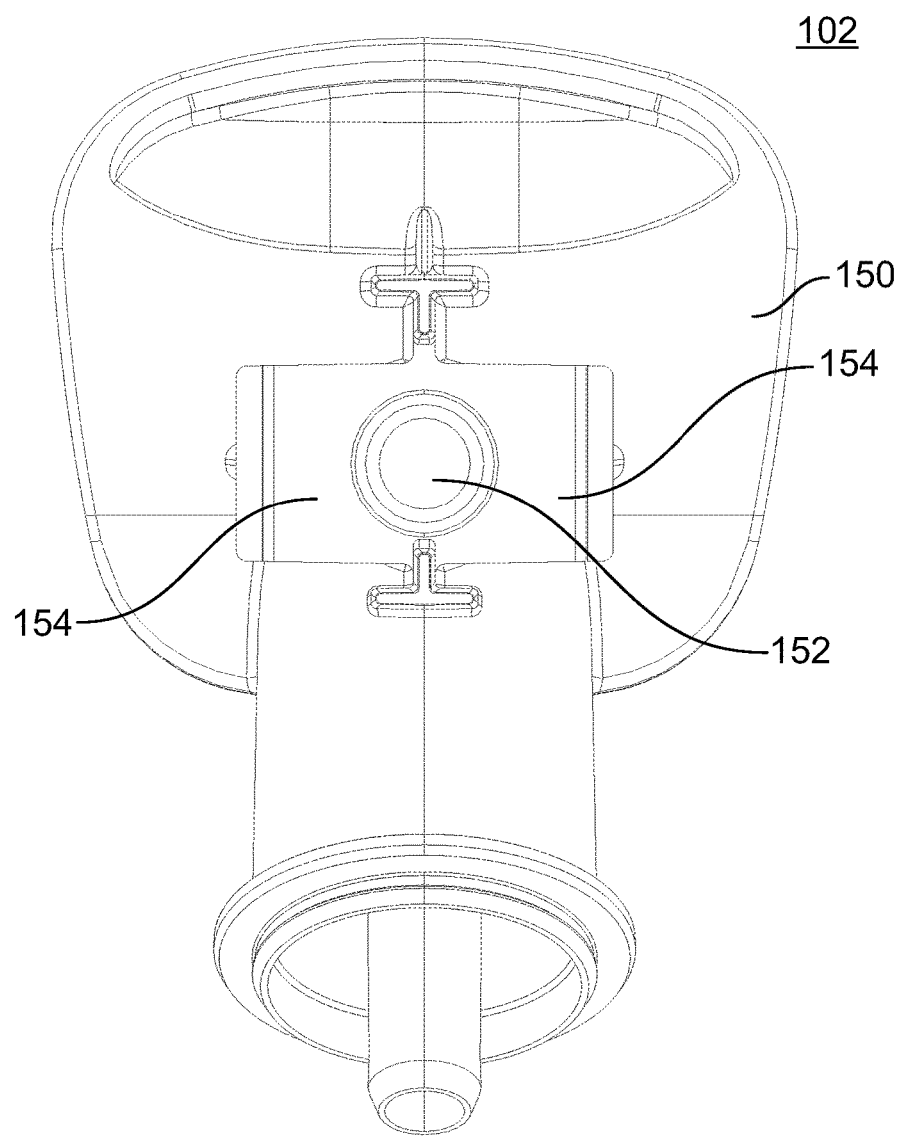
FIG. 18 is a rear view of the spout body.

As shown in FIG. 3, linked poppet valves 300 are located between the first end 208 of the nozzle 200 and the front face 103 of the spout body 102. As best seen in FIGS. 13, 14A and 14B, the linked poppet valves 300 comprise a liquid control poppet 302 and an air control poppet 304. The liquid control poppet 302 controls the flow of liquid from the reservoir 101 into the nozzle 200. The air control poppet 304 controls the flow of ambient air into the reservoir 101.

Liquid can flow out of the reservoir 101 and into the liquid inlet port 215 of the liquid conduit 223 when the liquid control poppet 302 opens. Vent air can flow into the air inlet port 219 and through the air conduit 221 to the reservoir 101 when the air control poppet 304 opens.

In the preferred embodiment of the liquid dispensing spout 100, the liquid poppet 302 opens before the air control poppet 304 opens. Similarly, when dispensing is stopped, the air control poppet 304 closes prior to the liquid control poppet 302. Opening the liquid poppet 302 before opening the air control poppet 304 when dispensing liquid allows a vacuum to develop in the reservoir 101 during the time that the air control poppet is closed. The vacuum draws out of the vent tube 600, liquid that might be trapped in the tube 600 when the reservoir 101 is rotated to dispense fuel, as shown in FIGS. 25A and 25B.

The preferred embodiment of the liquid control poppet 302 has a shape resembling an egg, i.e., a substantially prolate-spheroid having opposing ends identified by reference numerals 308 and 309. The shape of the preferred liquid control poppet 302 is perhaps best seen in FIGS. 13 and 14, as well as FIG. 19B, which provides a top view of the linked poppet valves 300.

A first or front end 308 of the first poppet 302 has a tapered portion 307, which narrows the front end 308 inwardly to form a stem 310 and which helps liquid stream smoothly over the over the poppet 302. The opposite, rear end 309 of the liquid control poppet 302 is also tapered to reduce eddy currents in the liquid. The stem 310 and the first, liquid control poppet 302 each have a central axis 324, 326. The axes 324, 326 are preferably co-axial.

FIGS. 26-32 show various alternate embodiments of linked poppets 300. Such alternate embodiments have front ends 308 and/or rear ends 309, which are truncated or significantly flatter (e.g., FIGS. 26-28 and 31) than the front and rear ends of the lined poppet preferred embodiment. Alternate embodiments have O-rings that are offset from each other in different directions and different distances. Other alternate embodiments have valve stems with different cross sectional shapes, e.g., FIGS. 26, 27 and 28. At least one alternate embodiment has a valve stem located between the poppets, i.e, FIGS. 30 and 32.

In preferred embodiments, the first end 308 of the liquid control poppet 302 has an O-ring groove 330 located in and circumscribing the tapered portion 307 of the liquid control poppet 302. An O-ring 332 in the O-ring groove 330 essentially provides the liquid control poppet 302 with a "liquid sealing surface," which when urged or biased against an appropriately shaped valve "seat" is able to prevent or stop liquid from flowing out of the reservoir 101. In other words, the liquid control poppet 302 is closed when the O-ring 332 contacts a corresponding "seat" 125 inside the upper orifice 108 of the spout body 102. As described below, a spring biases the valve stem 310 and the O-ring 332 against the seat 108 in the spout body 102.

The far end or "distal end" 312 of the valve stem 310, i.e., the end of the valve stem 310 furthest from the poppets 302, 304 comprises a fork-like clip 314. The clip 314, which comprises part of a linked poppet actuator 400, is preferably embodied as two, spaced-apart and substantially parallel tines 316, 318.

As best seen in FIG. 13, the tines 316, 318 of the preferred embodiment are substantially gutter-shaped. The far end 319 of each gutter-shaped tine 316 has a rectangular thru-opening or "window" 320. Each window 320 receives a protuberance that extends radially from a "button" 406, best shown in FIG. 19A. Together, the gutter shape and windows 320 allow the tines 316, 318 to snap together and effectively grasp the button 406, without requiring tools or equipment.

The second poppet 304 controls air flow between the spout 200 and reservoir 101. As shown in FIGS. 13 and 14A, the preferred embodiment of the second poppet 304 is essentially a short piston having an O-ring groove 334 that circumscribes the second poppet 304 near its first end 305. Such a poppet is considered herein as being substantially cylindrical. It's first end 305 is also preferably chamfered 335. A soft, compressible O-ring 336 in the groove 334 provides an air flow sealing surface when the second poppet is inside an appropriately shaped and sized chamber or applied against an appropriately sized and shaped "seat."

The second poppet 304 has of course its own corresponding cross-sectional shape and central axis 326. Inasmuch as the poppets 302, 304 move at the same time in substantially the same direction by the same distance, the central axes of the poppets 302 and 304 are preferably coplanar or at least substantially coplanar and at least substantially parallel to each other as well as the central axis 324 of the stem 310. The substantial co-planarity and substantial parallelism of the axes means that the two poppets 302 and 304 and stem 310 travel the same distance, in the substantially same direction along substantially parallel to each other responsive to translation of the stem 310.

For purposes of clarity, as used herein "coplanar" means lying in or on, the same geometric plane. It should also be construed as lying in or on, substantially the same plane because manufacturing tolerances and processes cannot guarantee that any two axes, O-ring grooves, O-rings or any other similar product are exactly the same.

Figure 12:
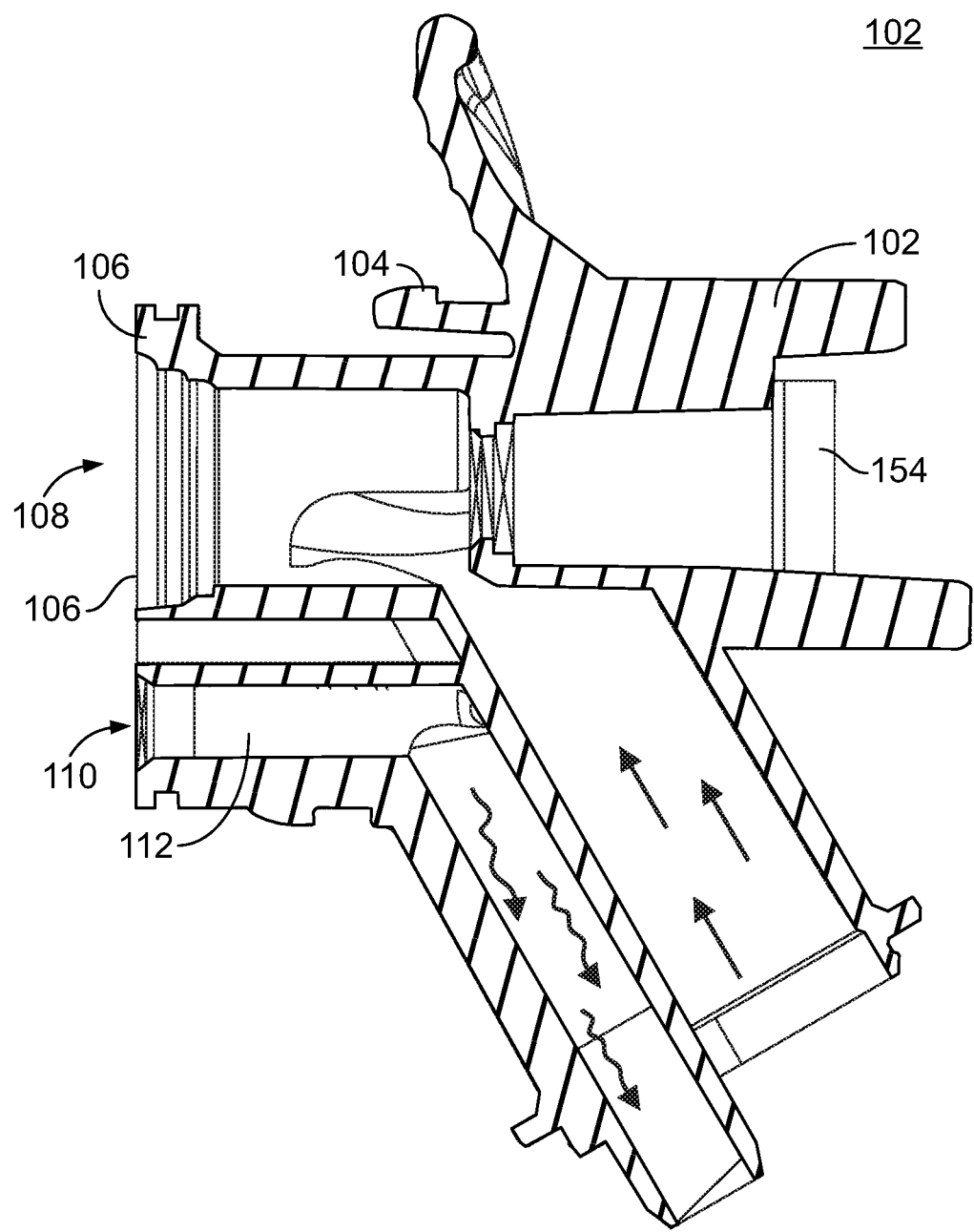
FIG. 12 is a cross sectional view of the spout body.

The chamfer 335 on the second poppet 304 facilitates movement of the poppet 304 into and out of a tapered cylinder 112 formed in the spout body 102 and best seen in the cross section of the spout body 102 provided in FIG. 12. The tapered cylinder/airflow control chamber 112 has an air inlet, embodied as the lower orifice 110 in the spout body 102.

As the O-ring 336 slides back and forth in the tapered cylinder 112, which is considered herein to be an airflow control chamber, the soft O-ring 336 effectively lengthens the distance that the air control poppet 304 has to travel in the tapered cylinder 112, relative to the distance that the liquid control poppet 302, before the air poppet 304 is "open." Stated another way, slight compression of the O-ring 336 for the air control poppet 304 in the tapered cylinder enables the liquid control poppet 302 to open and allow liquid to flow before the air control poppet 304 opens to such an extent that a volumetric air flow rate into the reservoir 101 is sufficient to let fluid out of the reservoir and nozzle 200 without pulsation.

The poppets 302 and 304 are mechanically coupled to each other by a web 306. Both poppets 302, 304 and the web 306 are translated or "actuated" by a single valve stem 310. In the preferred embodiment, the stem 310 extends from the front end or side 308 of the liquid control poppet 302.

The web 306 has a thickness, which is less than the width, $W_1$ of the slot 214 formed in the "top" surface of the air conduit port 216 at the first end 208 of the nozzle 200. The web 306 also has a flow path separator 322, sized, shaped and arranged (configured) to cover the slot 214. The flow path separator 322 thus has a width $W_2$ greater than the width, $W_1$, of the slot 214. The flow path separator 322 preferably has a concave curvature substantially the same as the convex curvature of the air conduit 221 in the nozzle 200 to provide a barrier for the slot 214. In the preferred embodiment, the flow path separator is molded with the web, poppets and stem. In an alternate embodiment, however, the flow separator is clipped or snapped onto the web 306.

For cost reduction purposes, the poppets 302, 304, web 306, stem 310 and flow path separator 322 are preferably formed using molded plastic and are a single unitary structure. The flow path separator can also be integral with or connected to the poppets 302, 304 themselves.

Plastics are known to have a tendency to "creep" or "cold flow" over time. The web 306 is thus constructed to have a relatively large width $W_3$ substantially equal to the length of the slot 214 in order to strengthen the web and usage-induced creep.

Figure 10:
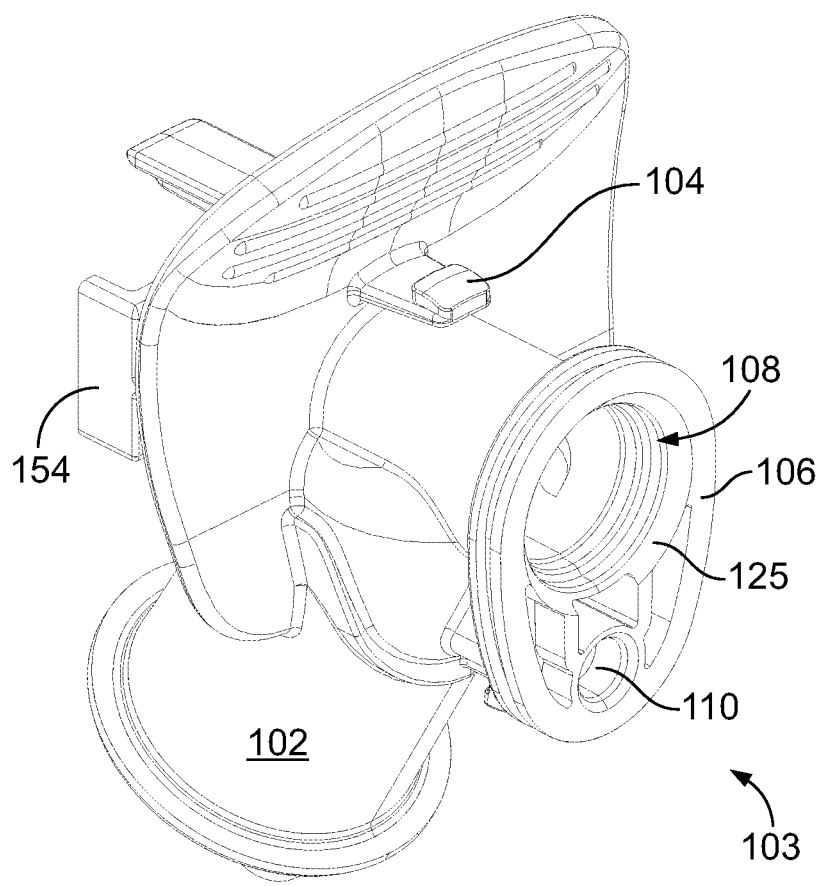
FIG. 10 is an isometric view of the front side or face of the spout body.
Figure 11:
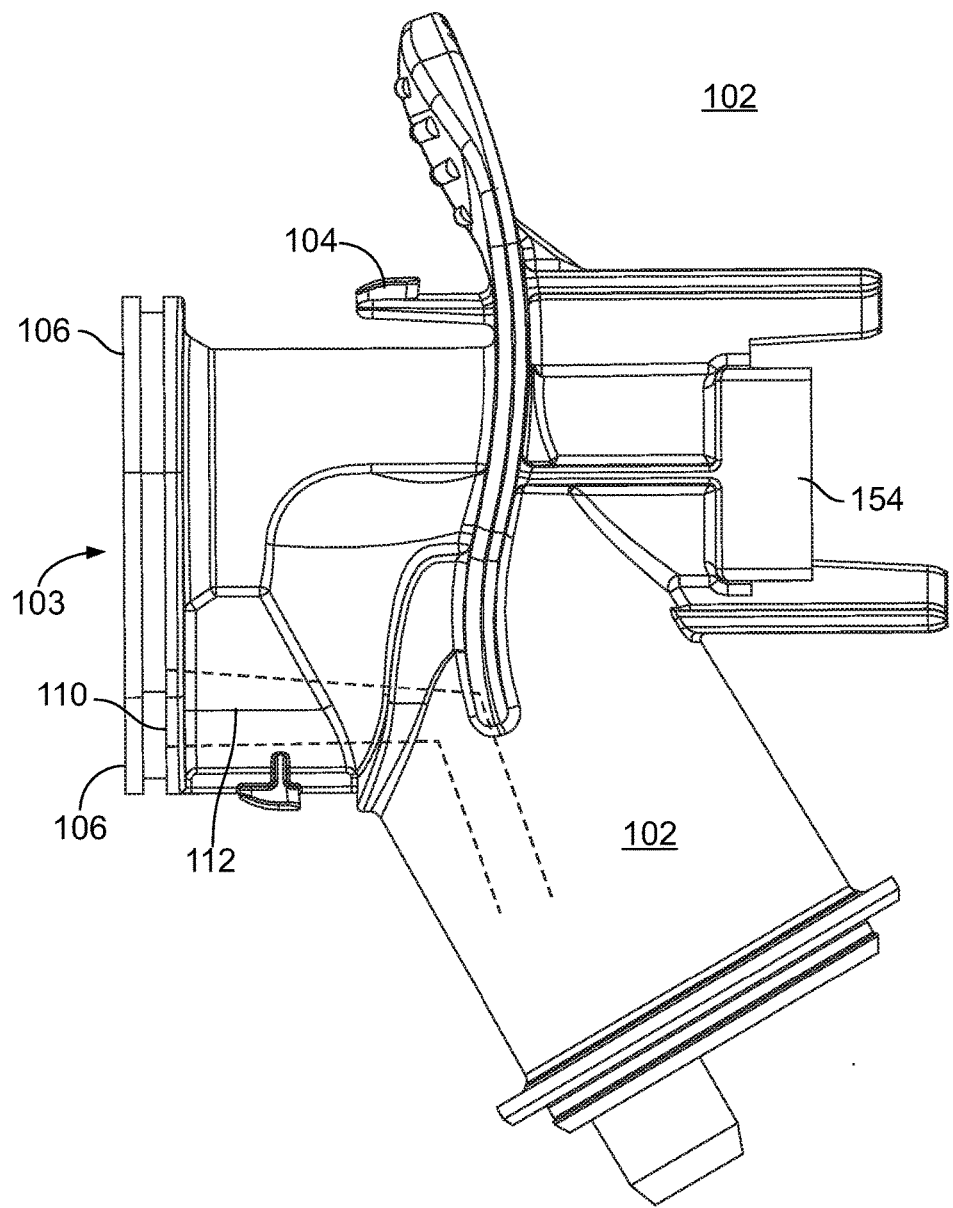
FIG. 11 is a side view of the spout body.

FIG. 10 is a perspective view of the front side or front face 103 of the spout body 102. FIG. 11 is a side view of the spout body 102. FIG. 12 is a cross sectional view of the spout body 102.

The substantially ovate-shaped flange 106 on the front side or face 103 of the spout body 102 circumscribes two orifices 108 and 110. The flange 106 thus mates with the substantially ovate-shaped first end 208 of the nozzle 200.

In FIG. 10, the top "orifice" 108 has a short conic section that provides an "interface surface 125" that meets the O-ring 332 on the liquid control poppet 302. The liquid control poppet 302 is closed when its O-ring 332 is seated against the interface surface 125.

As best seen in FIGS. 13, 14A and 14B, the linked poppets 302 and 304 are laterally separated from each other as well as "coupled" to each other by the web 306.

Referring now to FIG. 13 and FIG. 14, the liquid control poppet 302 has an O-ring groove 330 located adjacent the front end 308. The O-ring 332 in the O-ring groove 330, is sized and shaped to fit snugly into the O-ring groove 330 and provide a liquid sealing surface for the first poppet 302 that alternately makes contact with and separates from the mating surface 108 in the spout body 102.

The air control poppet valve 304 has an air sealing surface, comprising a second O-ring 334 that fits into a correspondingly-sized O-ring groove 331. The O-ring 334 and the air control poppet valve 304 extend into an elongated tapered air control chamber 112, best seen in FIG. 12. The tapered air control chamber is preferably a tapered cylinder in the spout body 102 and accessed through the lower opening 110 in the spout body 102.

As best seen in FIG. 14B, the O-ring 332 and the air sealing surface provided by the O-ring 331 on the air control poppet valve lie in separate and different geometric planes the edges of which are identified by reference numerals 352 and 354. Those two planes 352 and 354 are substantially parallel and purposefully separated from each other by a relatively small distance denominated herein as an O-ring offset spacing or distance 350.

Because the O-rings are offset, the coupled-together linked poppet valves 300 open at different linear displacements of the valve stem 310. The liquid poppet 302 opens to allow liquid to flow from a reservoir before the O-ring 332 of the air control poppet 304 separates from its mating air sealing surface 110 in the spout body 102 thereby allowing air to flow through the tapered cylinder 112. Similarly, when the linked poppets 302, 304 are to be closed, the O-ring 332 of the liquid control poppet 302 contacts its "liquid control valve seat" 108 before the O-ring 334 of the air control poppet contacts, and seals off the tapered cylinder 112 before the liquid control poppet 302 closes. The staggered opening and closing allows a vacuum to be developed in the reservoir 101 before the air control poppet 304 opens. That vacuum draws out of the vent tube 600, liquid that might be trapped in the vent tube 600 as the reservoir 101 is tilted.

FIG. 25A shows the liquid dispensing spout 100 attached to the conventional gasoline can, i.e., reservoir 101. The vent tube 600 extends into liquid 2502. A column of liquid 2504 is in the tube 600.

When the reservoir 101 is inverted or tipped to dispense the liquid, as shown in FIG. 25B, some of the column of liquid 2504 will be "trapped" in the vent tube 600. Liquid 2502 trapped in the vent tube 600 will prevent air from flowing through the tube 600 and into the reservoir 101. Properly venting the reservoir 101 with an extended vent tube 600 thus requires removing trapped liquid 2504 from the vent tube 600.

Offsetting the O-rings 332, 334 enables the linked poppet valves to open at different displacements of the valve stem 310. Stated another way, the liquid control poppet 302 will open before the air control poppet 304 opens. Liquid will thus flow past the liquid control poppet 302, from the reservoir 101, before air can flow past the air control poppet 303 and into the reservoir 101. Allowing liquid to flow out of the reservoir before air can flow in enables a vacuum to be developed inside the reservoir 101. The vacuum so developed draws liquid trapped in the air inlet tube 600, provided of course that the tube 600 is properly constructed as described below. The staggered openings of the liquid and air control poppets thus provides the spout 100 with the ability to siphon fuel or other liquid out of the vent tube 600 that would otherwise be trapped in the air pickup tube 600 as a fuel tank or other liquid reservoir to which the spout 100 is connected, is inverted. The reservoir 101 can thus be properly vented by air flowing in from the nozzle 200.

Linked Poppet Valve Actuator

FIGS. 15-20 depict an actuator 400 for the linked poppet valves 300. The actuator 400 comprises the aforementioned clip 314 on the distal end 312 of the valve stem 310 and a valve actuator block 402, best seen in FIG. 19A.

Referring again to FIGS. 14A, 14B, 16 and 17, the clip 314 portion of the linked poppet valve actuator 400 is comprised the aforementioned tines 316, 318 at the distal end of the valve stem 310. Each tine 316, 318 has opposing first and second ends and a "window" or hole 320 located near the distal end, i.e., the end furthest from the poppet 302.

The window 320 in each tine 316, 318 is sized, shaped and arranged to fit around, i.e., receive, a protuberance 404 extending radially from the surface of a substantially frusto conically-shaped button 406. The button 406 extends or projects substantially orthogonally from a substantially planar and annulus-shaped, spring receiving surface 408 that is on a first face 410 of the valve block 402. An undercut 416 separates the button 406 from the spring receiving surface 408 so that the windows 320 in the tines 316, 318 can fully encircle the protuberances 404.

The protuberances 404 and the windows 320 engage and lock each other together. The valve block 402 and the linked poppet valves 302, 304 are thus locked together.

Figure 19A:
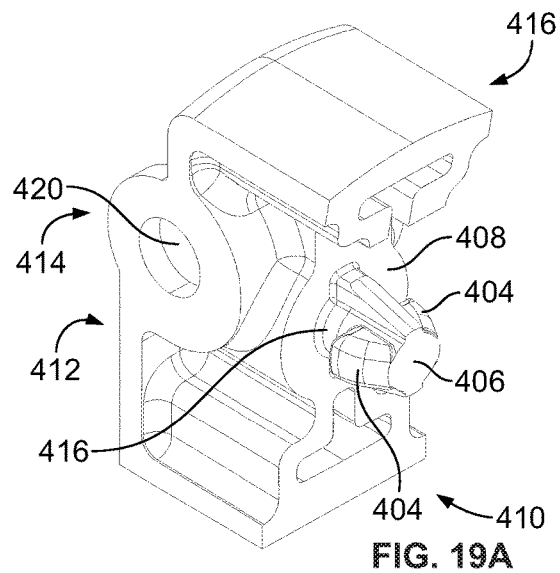
FIG. 19A is a perspective view of a valve actuator block.
Figure 19B:
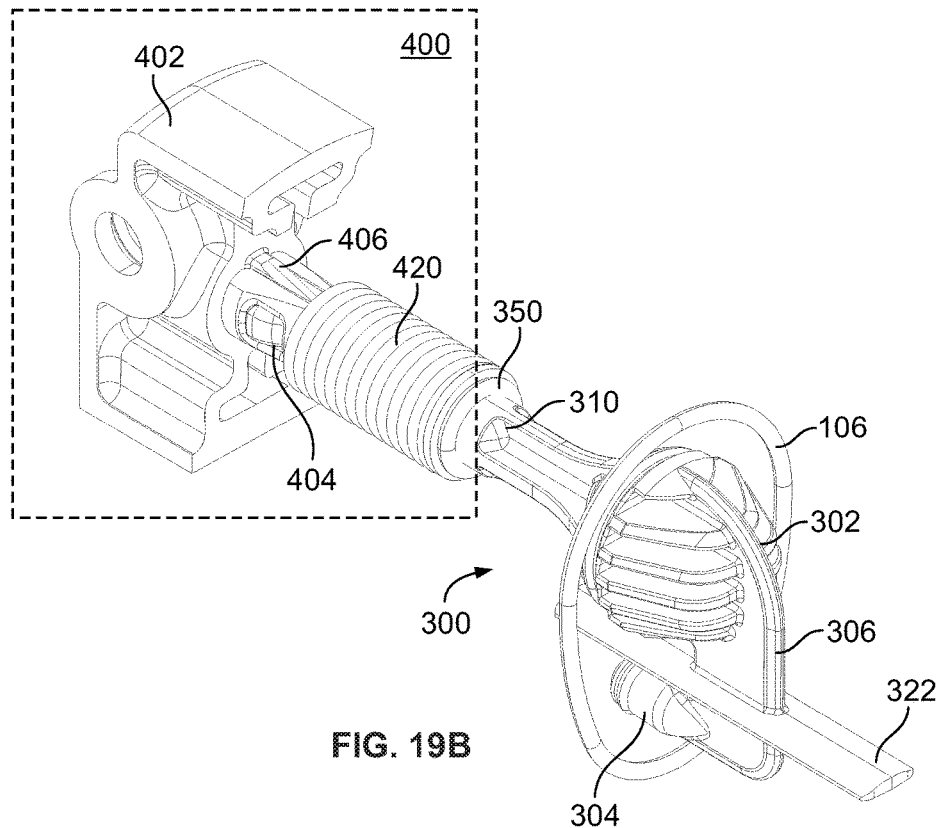
FIG. 19B is a perspective view of the valve actuator block engaged with the clip on the distal end of the valve stem of the linked poppet valves and encircled by a coil spring.
Figure 20:
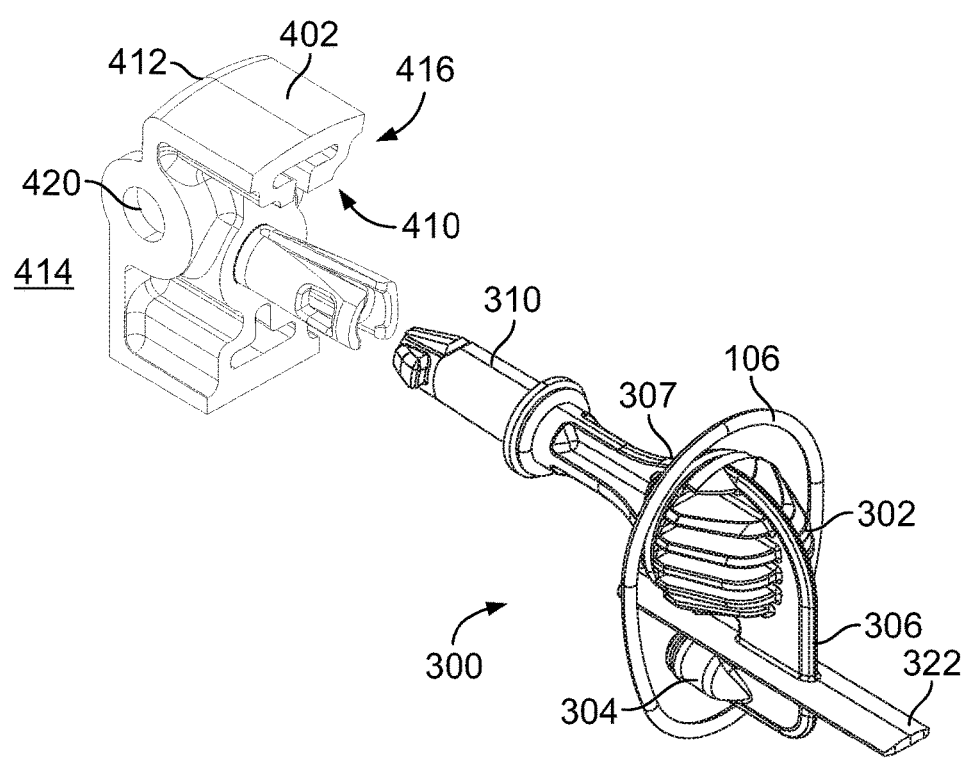
FIG. 20 is a perspective view of an alternate embodiment of a valve actuator.

As best seen in FIG. 19B, a coil spring 420 fits over the valve stem 310. The valve stem 310, however, is first inserted through an orifice or hole 152 that extends horizontally through the spout body 102.

One end of the spring 420 rests in the hole 152. The valve stem travel limiter 154 is essentially a flat, rectangular pad, orthogonal to the hole 152 and contacts the receiving surface 408 when the valves are fully open. The opposite end of the spring 420 rests against the spring receiving surface 408 of the valve block 402.

Figure 9:
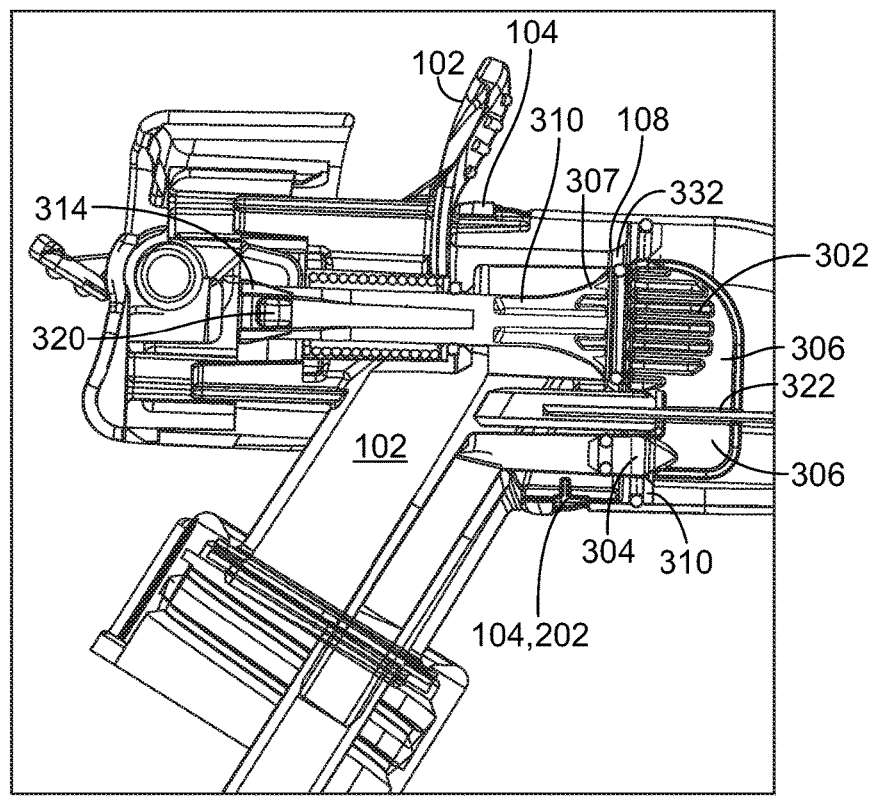
FIG. 9 is an isolated cross sectional view of the liquid dispensing spout showing linked poppet valves in greater detail.

When the liquid dispensing spout 100 is assembled, the spring 420 is compressed between the spring receiving surface 408 and the valve stem travel limiter 154. The spring 420 thus exerts compressive force against the spout body 102 and through a washer and O-ring for the valve block 402. Since the valve block 402 is latched to the valve stem 310 by the protuberances 404 and clip 314, the spring biases the poppet valves 302, 304 to a normally closed position. The position and functionality of the coil spring is best seen in FIG. 9, which is an isolated cross-sectional view.

When the actuator block 402 and button 406 are urged toward the rear face 150 of the spout body 102, the valve stem 310 and poppets 302, 304 are urged away from the spout body 102, toward the nozzle 200 and away from the valve sealing surfaces in the spout body 102. Such movement of the valve stem compresses the spring, which applies a compressive force to the valve block 402 that also applies a tensile force to the valve stem 310.

Child-Resistant Actuator

Figure 21:
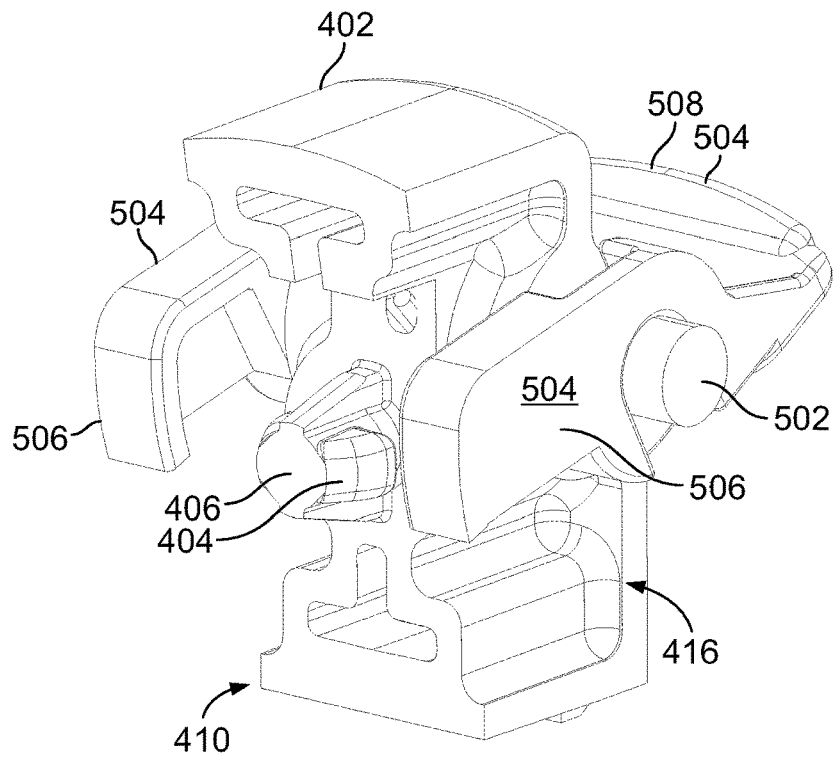
FIG. 21 is a rear perspective view of a child-resistant liquid dispensing spout actuator.
Figure 22:
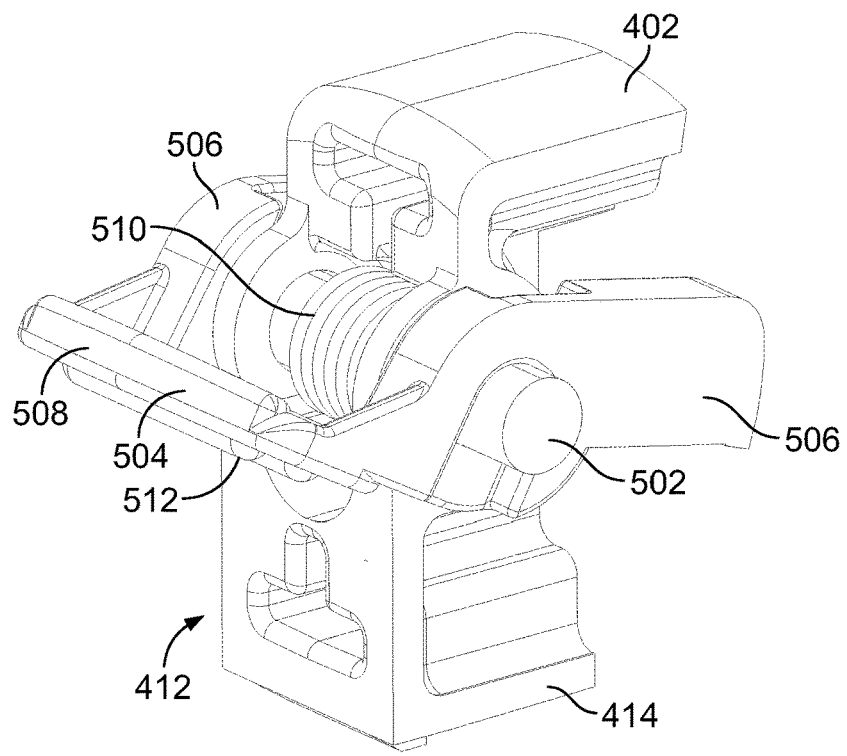
FIG. 22 is a front perspective view of the child-resistant liquid dispensing spout actuator.
Figure 23:
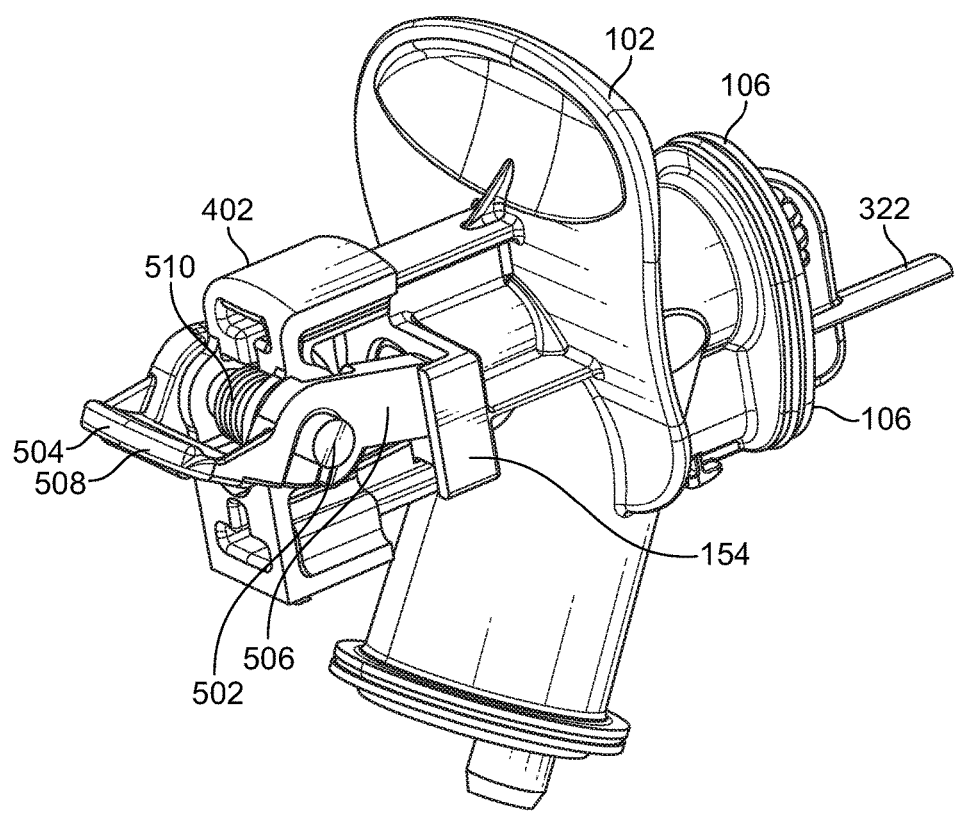
FIG. 23 is a front perspective view of the child-resistant liquid dispensing spout actuator mounted on the spout body.

As stated above, the liquid dispensing spout 100 includes a child-resistant actuator 500, best seen in FIGS. 21, 22, and 23. The child-resistant actuator 500 comprises the aforementioned travel limiter 154 portion of the spout body 102, the aforementioned valve actuator block 402, a fulcrum pin 502 and a generally U-shaped lever 504 that pivots on, or around the fulcrum pin 502.

For purposes of the child-resistant actuator, the valve stem actuator block 402, is considered as having two opposing faces 410, 412 and two opposing sides 414, 416. The button 406 on the first face 410 engages and latches the valve stem clip 314.

As described above and as can be seen in the figures, the liquid dispensing spout 100 is "operated" by moving the valve stem actuator block 402 toward the spout body 102. The valve stem actuator block 402 movement is constrained by position of parallel legs 506 of a substantially U-shaped lever 504, vis-à-vis the planar travel limiter 154 of the spout body 102.

As best seen in FIGS. 21, 22, and 23, the lever 504 is mounted on the fulcrum pin 502. The fulcrum pin 502 extends through a hole 420 that extends through the valve stem actuator block 402, orthogonal to the sides 414, 416 of the block 420.

In the preferred embodiment, the fulcrum pin 502 and the hole 420 have an interference fit between them, in which case the lever 504 pivots on the fulcrum pin 502. In an alternate embodiment, the fulcrum pin 502 and the lever 504 have an interference between them; the lever 504 thus pivots in the hole 420.

Regardless of how and where the lever 504 pivots, the lever 504 pivots or "rotates" through an angle of up to about ninety degrees, responsive to a user pushing upwardly or downwardly on an opposite, "user" end or tab 508 of the lever 504. Stated another way, the lever 504 can be manipulated by a user's thumb, palm or finger to rotate the lever 504 on the fulcrum pin 503 through an angle of up to about ninety degrees.

The user end or tab 508 of the lever 504 extends through an opening or window in a cover for the valve stem actuator block. A coil "lever spring" 510 is "wrapped around" the fulcrum pin 502. The opposite ends of the spring 510 exert force against the second face 412 into a cylindrical diagonal pock (not shown) of the valve stem actuator block 402 and the user end 508 of the lever 504 to bias the lever 504 be horizontal, substantially as shown in FIGS. 21 and 22.

The lever return spring 510 continuously biases the lever 504 to be horizontal such that the legs 506 are directed to toward the valve stem actuator block travel limiter 154 portion of the spout body 102. When the legs 506 are horizontal, the valve stem actuator block 402 is prevented from moving toward the spout body 102. Constraining the movement of the valve block actuator 402 by the legs of the lever 504 thus prevents the valve stem 310 and the poppets connected to it from being moved, preventing the poppets from being opened. Constraining the valve block actuator 402 also prevents pressure inside the reservoir 101 from "pushing" the poppets open. The child-resistant actuator thus prevents vapors in the reservoir 101 from escaping.

When the lever is pushed upwardly or in an alternate embodiment downwardly, the lever 504 and its legs 506 rotate around the fulcrum pin 502 to either a vertical or nearly vertical position, allowing the valve actuator block 402 to translate toward or into the spout body 102. When the valve actuator block moves toward the spout body 102, the valve stem 310 moves through the orifice in the spout body urging the poppets away from their sealing surfaces and allowing fluid to flow as well as air to enter the reservoir.

Those of ordinary skill in the art should recognize that the legs 506 of the lever 504 are preferably straight but can also be bent or curved. The length of the legs 506 also needs to be slightly less or shorter than the distance between the travel limiter 154 and the fulcrum pin 502.

The two legs 506 are preferably the same length. In an alternate embodiment, however, the legs 506 can have different lengths but in such an embodiment, the travel limiter 154 has different-height surfaces such that a shorter leg 506 meets the travel limiter 154 "simultaneously" with a longer leg.

Those of ordinary skill in the art should also recognize that maximum travel of the valve actuator block 402 is possible when the lever 504 is rotated about 90 degrees around the fulcrum pin 502. Lesser angular displacements will allow the valve actuator block to travel smaller distances decreasing the opening areas on the two poppets.

Figure 34:
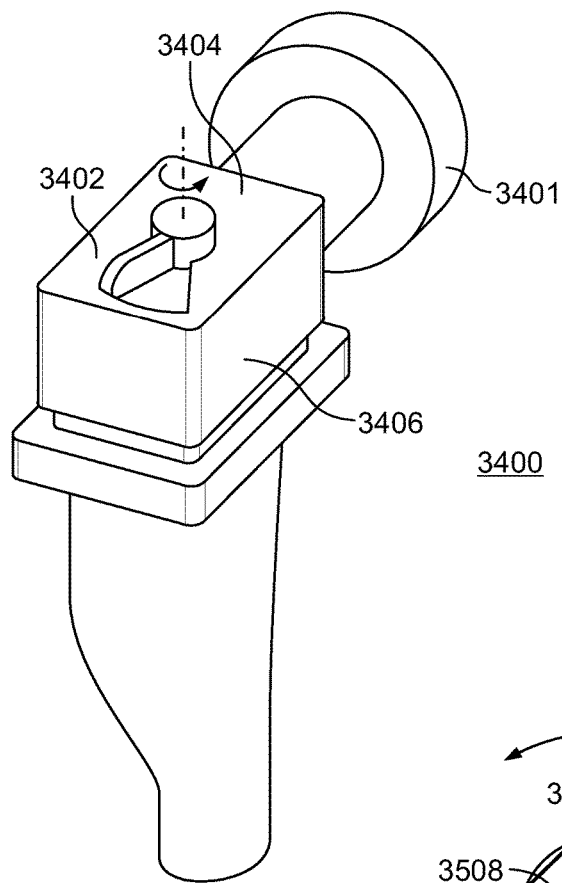
FIG. 34 shows an alternate embodiment of a child-resistant actuator for a liquid dispensing spout.

FIG. 34 shows an alternate embodiment of a child-resistant actuator 3400. An axially rotating cam 3401 enables and disables engagement of the valve actuator block with the valve stem. A rotatable tab 3402 on a front face 3404 of a push-button 3406. The back face of the push-button 3406 abuts the valve actuator block. Rotating the tab 3402 enables and disables the push button, enabling and disabling the spout 100 accordingly.

Figure 35:
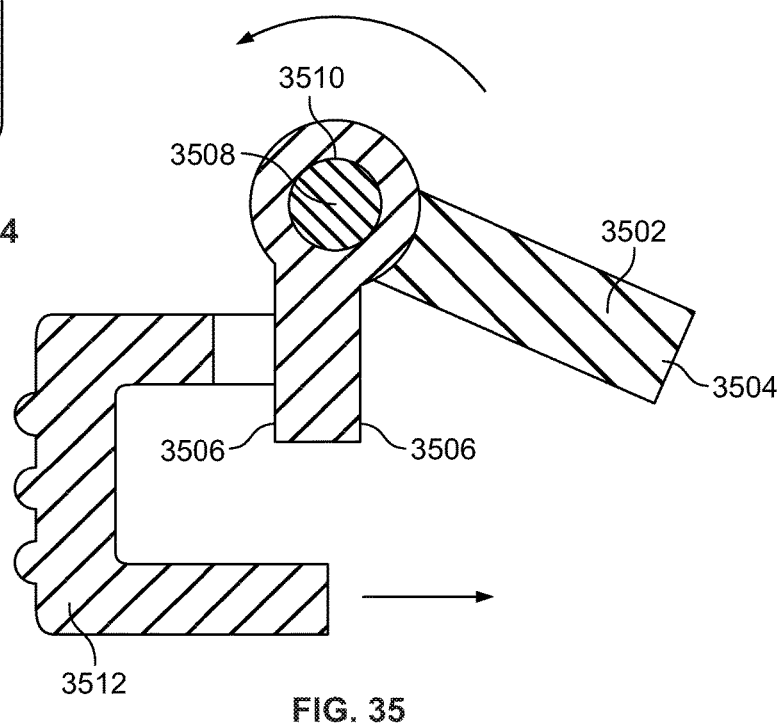
FIG. 35 shows an alternate embodiment of a child-resistant actuator for a liquid dispensing spout.

In another embodiment, shown in FIG. 35, the legs 506 and tab 508 of the U-shaped lever 504 are separated from each other but mounted to work together. Stated another way, the U-shaped lever 504 is replaced by an L-shaped bracket 3402. Two legs 3404, 3406 of the L-shaped bracket 3402 meet at or near a pivot point 3408 through which a fulcrum pin 3410 extends. The L-shaped bracket 3402 pivots on the fulcrum 3410. A first leg 3406 of the L-shaped bracket 3402 abuts a substantially U-shaped actuator 3412. The longer, second leg 3404 extends toward the travel limiter 154. Depressing the actuator 3412 causes the separate L-shaped bracket 3402 to rotate on the fulcrum 3410, "rotating" the second leg 3404 into or away from the travel limiter 154.

Figure 36:
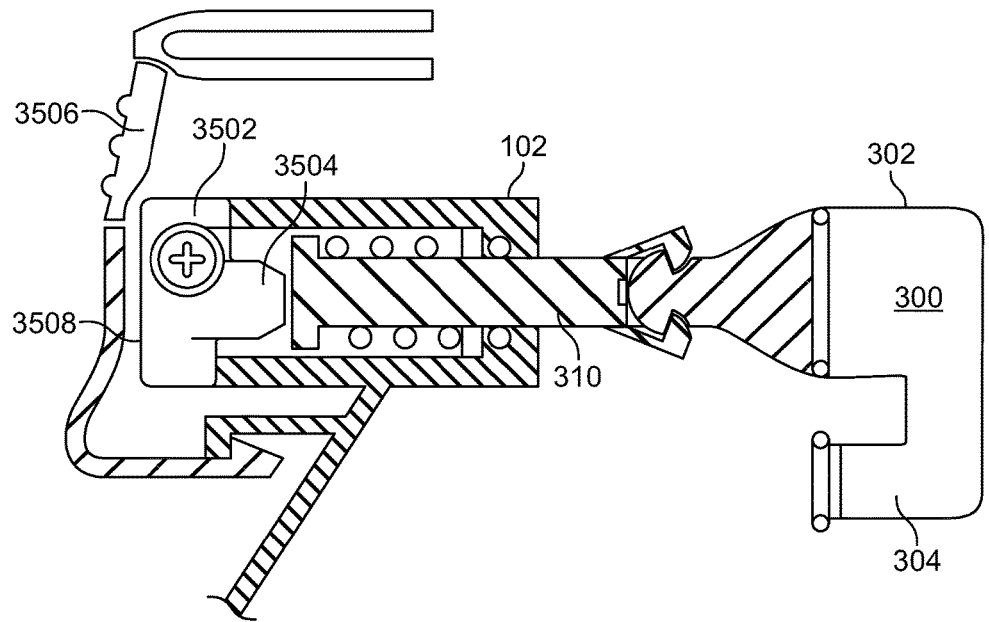
FIG. 36 shows an alternate embodiment of a child-resistant actuator for a liquid dispensing spout.

In yet another embodiment shown in FIG. 36, the length of the valve stem 310 is increased to extend substantially through the spout body 102. An actuator block 3602, which can slide in the spout body 102, has a front side 3604 that acts as a cam vis-à-vis the valve stem 310. A spring-loaded, pivotally-mounted tab 3606 is configured to press against the back side 3608 of such an actuator block 3602. Pushing the tab 3606 toward the poppets 302, 304, drives the poppets 302, 304 away from their sealing surfaces and opening them.

Those of ordinary skill in the art should also recognize that the U-shaped lever 504 with two legs 506 can also be replaced by a lever having only one-leg, i.e., a one-legged lever, which is pivoted the same way on a fulcrum pin. Regardless of whether a one-legged or two-legged lever is used, the two legs 506 (or one leg) of the child resistant actuator 504 acts as a travel limit to stop the poppet valve 300 from translating and thus disengaging the air and fluid O-rings 334 and 332 from their corresponding sealing surfaces. Disengagement of the O-rings from their sealing surfaces results in contents of the reservoir 101 being released to the environment.

An ASTM standard requires a valve for fuel reservoirs to resist 20 psi. A leg of a child-resistant actuator as disclosed herein eliminates the need for a spring 420 to provide such functionality. The stiffness of the spring used with the child-resistant actuator can thus be reduced lowering the force required to open the valves and easier for a consumer to operate.

Vent Tube

Figures 24A, 24B:
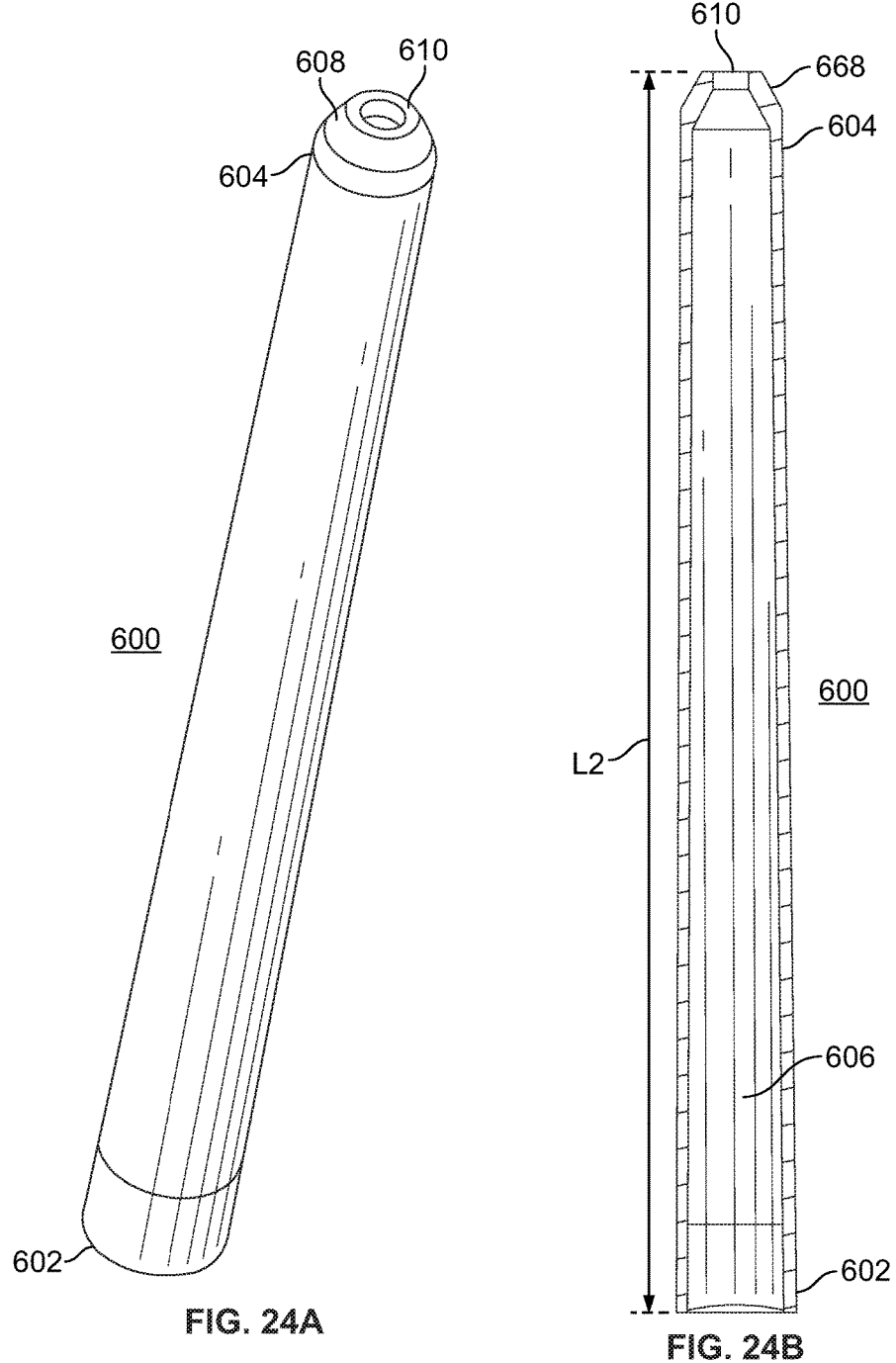
FIG. 24A is a perspective view of a vent tube for the liquid dispensing spout.
FIG. 24B is a cross sectional view of the vent tube.

Finally, FIG. 24A is a perspective view of a first embodiment of semi-rigid air inlet tube or vent tube 600. FIG. 24B is cross-sectional view of the air inlet tube 600.

The tube 600 has a first end 602 which is slid over a small diameter pipe nipple that extends downwardly from the spout body 102. An opposing distal or second end 604 is separated from the first end 602 by a length L2. L2 is chosen to be less than the inside vertical height of a liquid storage tank or reservoir 101 such that the second end 604 will be above the level of liquid in a storage tank when the tank is inverted to dispense liquid. See for example FIGS. 25A and 25B. In an alternate embodiment, however, L2 is selected to extend above the level of the liquid in the reservoir 101 when the reservoir 101 has been completely filled.

An interior channel 606 tapers in from the first end 602 toward the second end 604. The tapering configuration, or optionally the configuration with a small opening at the distal end 610, i.e., smaller than the remainder of the tube with parallel sides, improves the consistency of airflow into the tank.

Figure 37:
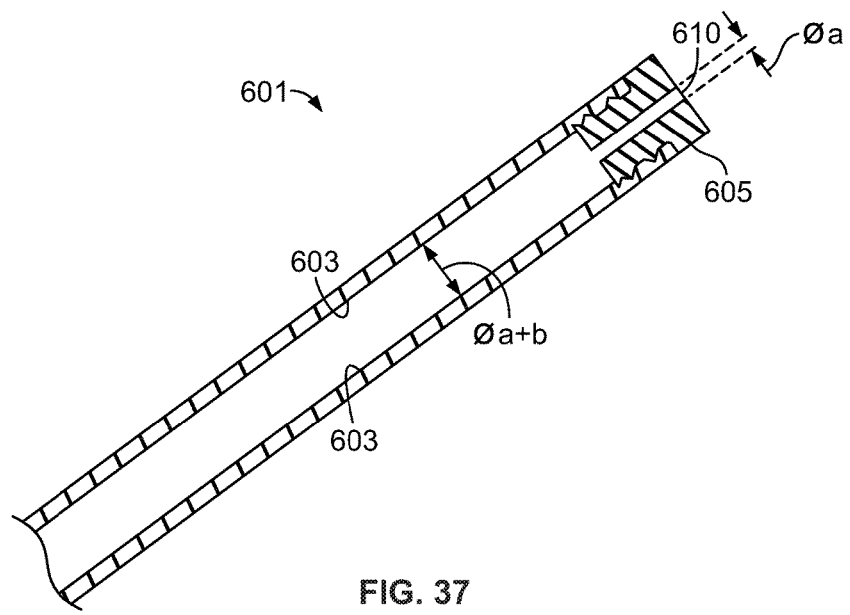
FIG. 37 shows an alternate embodiment of a vent tube for a liquid dispensing spout.

If liquid enters the tube at the smaller opening at the end of the tube 610, (undesirable but can happen) and drips into the tube, the cross section increases of expands the farther that the liquid droplet moves into the tube. The tapered cross section insures that airflow can flow around a droplet or droplets of liquid and maintain the flow of air into the tank to fill the negative pressure. Similarly, in an alternate embodiment shown in FIG. 37, the tube 601 is straight and has substantially parallel "sides" 603 with a small opening cap 605 at the distal end of the tube 601. As a droplet enters the small opening, the droplet travels into the parallel wall-tube 601 of greater cross section than 610, again allowing airflow to flow around the droplet. In FIGS. 24 and 24B, the cone-shaped nozzle 608 at the second end has a small diameter opening 610, the area of which is significantly less than the area of the opening at the first end 602. The diameters at the first and second ends 612 and 614 respectively are thus also different.

The length and diameters at the opposite ends, and the taper, were experimentally determined to enable liquid trapped in the vent tube 600 when the vent tube is inverted, to be drawn out of the vent tube by a shallow vacuum created by liquid flowing out of the reservoir without air being allowed in, at the beginning of a pour. Stated another way, the length, L2, the taper and the diameters at each end are selected such that a vacuum created inside a liquid container when the liquid poppet valve opens prior to the air inlet valve, creates a negative pressure that will draw liquid in the vent tube out of the tube and back into the tank out. In a preferred embodiment, L2 was about 5.25 inches.

Alternate Embodiments

Those of ordinary skill in the art should recognize that the structures disclosed above and as claimed hereinafter provide a dispensing spout for a liquid container that is child-resistant, enables the liquid to flow without liquid flow pulsation, ceases dispensing when the dispensing spout is submerged and which satisfies various other safety and functional requirements of governmental agencies.

Figure 26A:
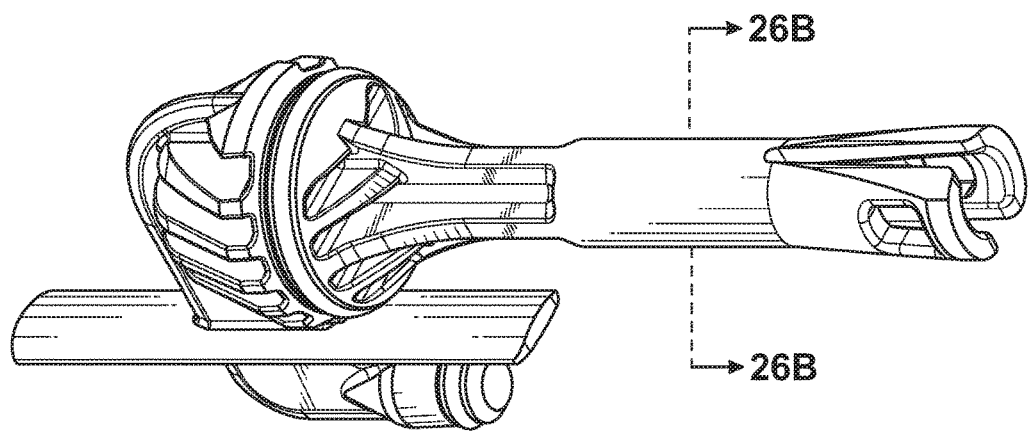
FIG. 26A is a perspective view of an alternate embodiment of linked poppet valves with an alternate embodiment of a valve stem.
Figure 26B:
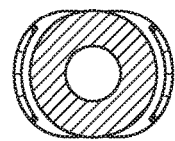
FIG. 26B is a cross section of the alternate embodiment of a valve stem that is shown in FIG. 26A.
Figure 27A:
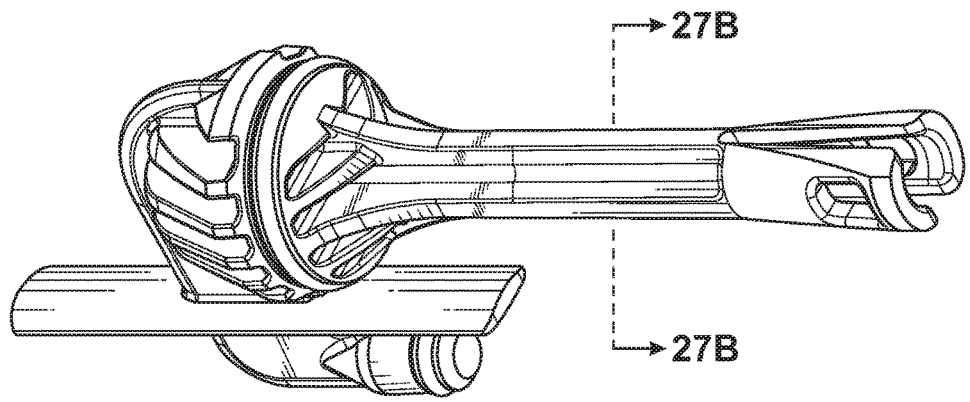
FIG. 27A is a perspective view of an alternate embodiment of linked poppet valves with an alternate embodiment of a valve stem.
Figure 27B:
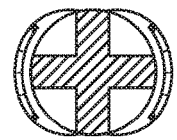
FIG. 27B is a cross section of the alternate embodiment of a valve stem that is shown in FIG. 26A.
Figure 28A:
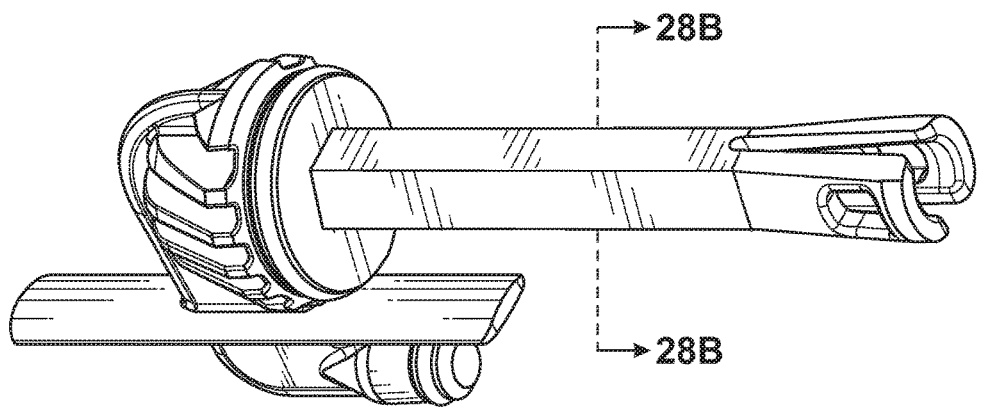
FIG. 28A is a perspective view of an alternate embodiment of linked poppet valves with an alternate embodiment of a valve stem.
Figure 28B:
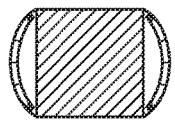
FIG. 28B is a cross section of the alternate embodiment of a valve stem that is shown in FIG. 26A.
Figure 29:
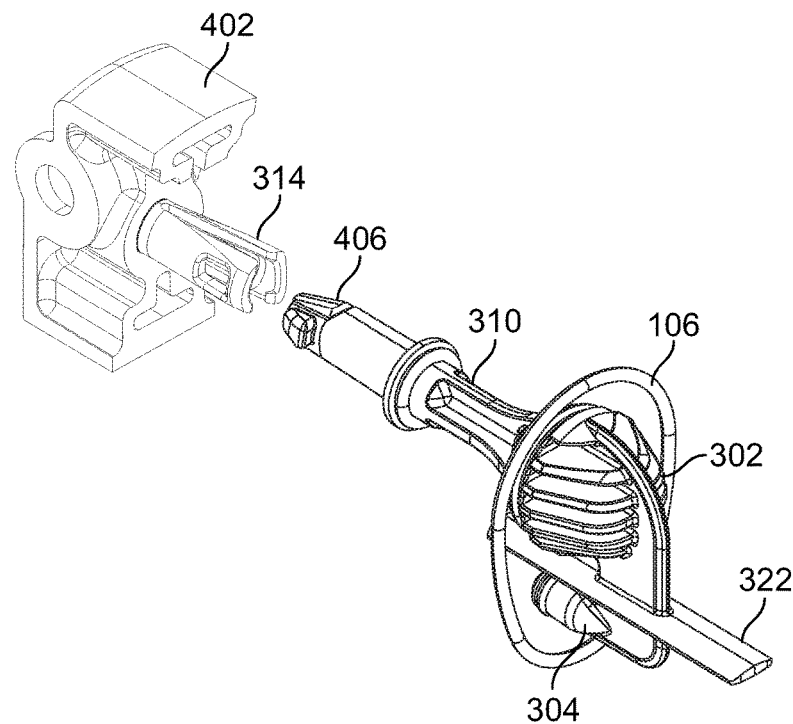
FIG. 29 shows an alternate embodiment of a linked poppet actuator.

In one alternate embodiment, the linked dual poppet valves have a stem 310 that is a hollow cylinder. An example of such an embodiment is shown in FIGS. 26A and 26B. In another alternate embodiment, the stem 310 has a cross sectional shape reminiscent of the Arabic letter X, an example of which is shown in FIGS. 27A and 27B. In yet another embodiment, the stem 310 has a cross sectional shape that is substantially rectangular, as shown in FIGS. 28A and 28B.

Figure 30:
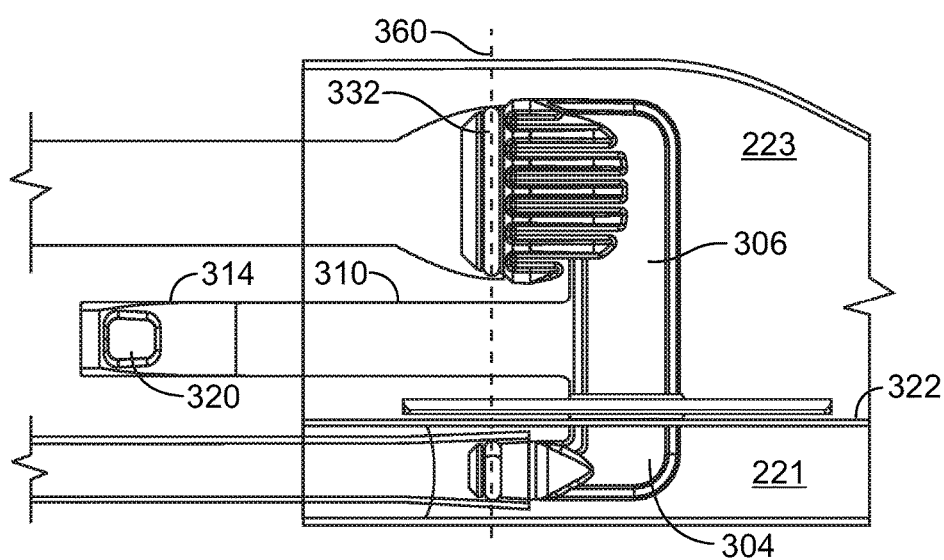
FIG. 30 shows an alternate embodiment of linked poppet valves, the alternate embodiment shown having poppet O-rings that are substantially coplanar, i.e., they lie on, or in, the same geometric plane.
Figure 31:
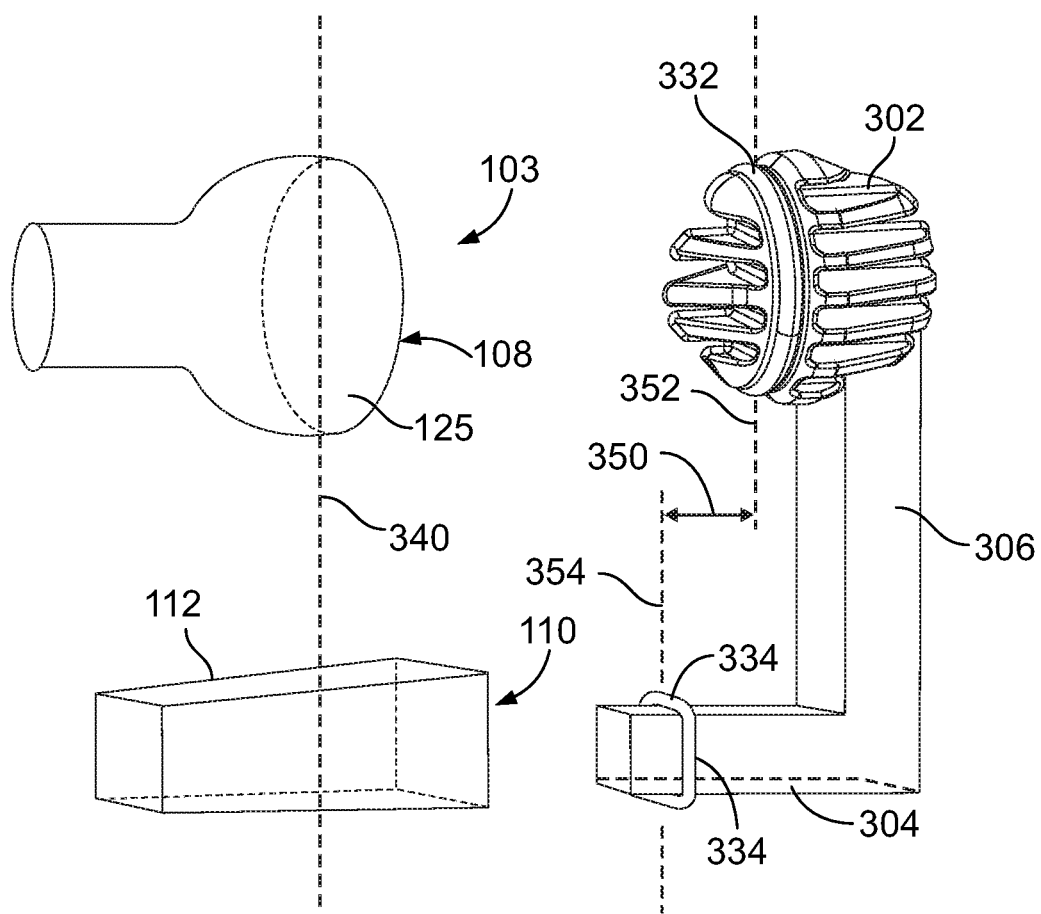
FIG. 31 shows an alternate embodiment of linked poppet valves.
Figure 32:
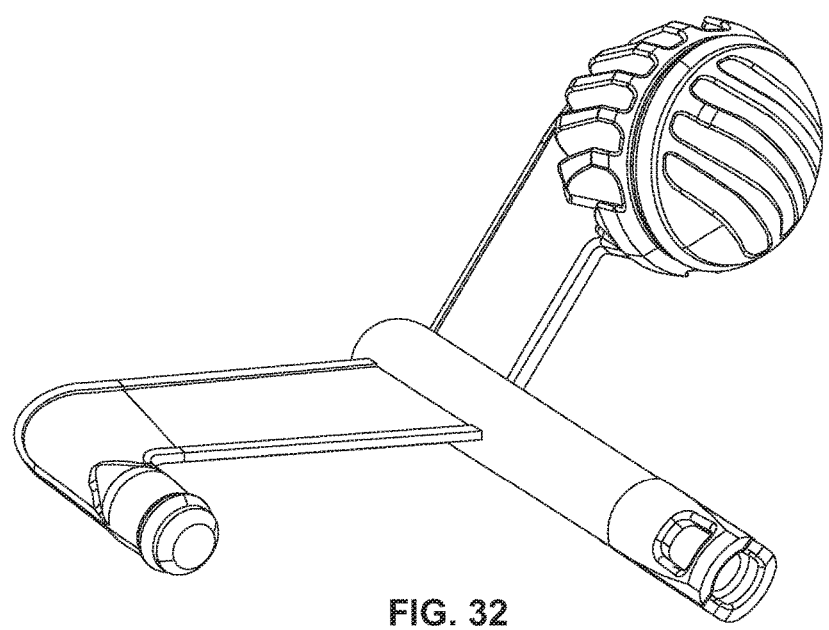
FIGS. 32 and 33 shown another alternate embodiment of linked poppet valves.
Figure 33:
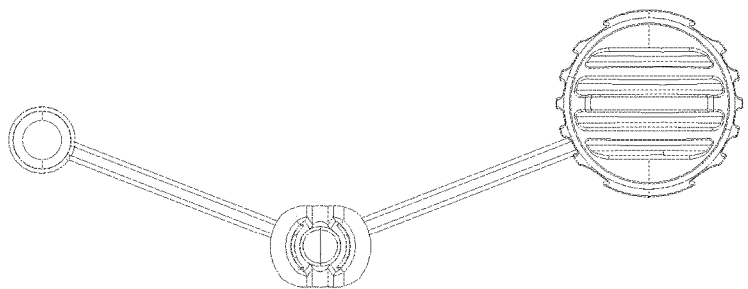

In another embodiment, the stem 310 is attached to or extends from the web 306 that separates and links the poppets 302, 304. Such an embodiment is depicted in FIGS. 30 and 32.

The leading and trailing edges of the liquid control poppet 302 can also be flattened. An example of a flattened leading edge is provided in FIG. 28A.

In the preferred embodiment, the liquid sealing surface of the liquid poppet valve 302 is an O-ring 334 made of rubber or other soft, pliable material. In an alternate embodiment, the liquid sealing surface is a pliable material that is "over-molded" (or "overmolded") a non-pliable material, molded to form the liquid control poppet. Similarly, in yet another alternate embodiment, the air sealing surface is a pliable material "over-molded" a non-pliable material, which is molded to form the air control poppet.

As used herein, the term, "lap" or "lapping" refer to processes by which two surfaces are worked or machined together, with or without abrasives, until a very close fit between them is produced. In an alternate embodiment, a portion of one or both of the liquid and air poppets 302, 304 is lapped with a mating surface in the spout body 102 to provide one or both sealing surfaces that are lapped to each other.

Alternate embodiments of the linked poppet valve actuator 300 and valve block exchange locations of the clip 314 on the valve block 402 and the engagement button 406 on the valve stem 310. See for example FIG. 29.

The foregoing description is for purposes of illustration only. The true scope of the invention is set forth in the following claims.

What is claimed is:

1. A child-resistant actuator for a liquid dispensing spout, the actuator comprising:
    a spout body comprising:
        an orifice configured to receive a valve stem having a terminal end;
        a valve stem actuator block travel limiter, located adjacent the orifice;
    a valve stem actuator block comprising:
        first and second opposing faces and, first and second opposing sides, the first face having a protuberance configured to make contact with the valve stem's terminal end;
        a fulcrum pin coupled between the first and second opposing sides, the fulcrum pin having a center axis and being configured to support a lever;
    the valve stem actuator block, being slidably coupled to the spout body and configured to translate between first and second positions relative to the spout body;
    the lever mounted on the fulcrum pin, at least one of the lever and the fulcrum pin being configured to rotate through an angle about the center axis of the fulcrum pin, the lever having an exposed, user-actuating end and a leg, both the user-actuating end and leg extending away from the fulcrum pin, the leg extending in a first direction, toward the valve stem actuator block travel limiter when the lever is at a first angular position and extending in a second and different direction away from the valve stem actuator block travel limiter when the lever is at a second and different angular position.

2. The child-resistant actuator of claim 1, wherein the lever has first and second legs extending away from the fulcrum pin.

3. The child-resistant actuator of claim 2, wherein the lever return spring comprises a coil spring, and wherein the fulcrum pin extends through coils comprising the coil spring, the coil spring having first and second ends which are substantially straight segments of wire comprising the coil spring, the substantially straight segment of wire at the first end abutting the valve stem actuator block, the substantially straight segment of wire at the second end abutting the lever.

4. The child-resistant actuator of claim 1, wherein the leg of the lever and the valve stem actuator block travel limiter are configured to hold a poppet valve closed.

5. The child-resistant actuator of claim 1, wherein the leg is curved.

6. The child-resistant actuator of claim 1, wherein the lever comprises a tab and a leg rotatably attached to the fulcrum pin, the tab and leg being separate structures.

7. The child-resistant actuator of claim 1, further comprising a lever return spring coupled to at least one of the lever and the fulcrum pin, the return spring being configured to continuously bias the lever toward the first direction.

8. The child-resistant actuator of claim 1, further comprising an actuator cover, the actuator cover having an interior space and interior sidewalls to which the valve stem actuator block is attached, the actuator cover also having a first side with an opening, through which the user-actuating end of the lever to projects.

9. The child-resistant actuator of claim 1, wherein the leg of the fulcrum has a length, which is less than the distance between the valve stem actuator block travel limiter and the fulcrum pin.

10. The child-resistant actuator of claim 1, wherein the protuberance on the valve stem actuator block extends into the orifice when the valve stem actuator block is in its first position.

11. The child-resistant actuator of claim 1, wherein the lever comprises first and second laterally spaced-apart legs, coupled to and extending away from a tab portion, the first and second laterally spaced apart legs having first ends coupled to the tab portion and second ends provided with holes, the holes being sized and shaped to receive the fulcrum pin, the first and second laterally spaced apart legs having a common length, which is less than the distance between the valve stem actuator block travel limiter and the fulcrum pin.

12. The child-resistant actuator of claim 1, wherein the lever is mounted on the fulcrum pin with an interference fit and wherein the fulcrum pin is mounted in the valve stem actuator block with a clearance fit.

13. The child-resistant actuator of claim 1, wherein the fulcrum pin is mounted in the valve stem actuator block with an interference fit and wherein the lever is mounted on the fulcrum pin with a clearance fit.

14. The child-resistant actuator of claim 1, wherein the lever and fulcrum pin are configured such that at least one of them rotates through a maximum angle of about ninety degrees.

* * * * *